US011973193B2

(12) United States Patent
Chen et al.

(10) Patent No.: US 11,973,193 B2
(45) Date of Patent: Apr. 30, 2024

(54) BATTERY WINDING METHOD, BATTERY WINDING SYSTEM, BATTERY AND ELECTRICAL DEVICE

(71) Applicant: CONTEMPORARY AMPEREX TECHNOLOGY CO., LIMITED, Ningde (CN)

(72) Inventors: Zhipeng Chen, Ningde (CN); Chao Chen, Ningde (CN); Jinghua Huang, Ningde (CN); Yaohui Wang, Ningde (CN); Qichao Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/296,448

(22) Filed: Apr. 6, 2023

(65) Prior Publication Data
US 2023/0246249 A1  Aug. 3, 2023

Related U.S. Application Data

(63) Continuation of application No. PCT/CN2021/115846, filed on Aug. 31, 2021.

(51) Int. Cl.
*H01M 10/0587* (2010.01)
*H01M 10/04* (2006.01)

(52) U.S. Cl.
CPC ... *H01M 10/0587* (2013.01); *H01M 10/0409* (2013.01); *H01M 10/0431* (2013.01)

(58) Field of Classification Search
CPC ......... H01M 10/0587; H01M 10/0409; H01M 10/0431

(Continued)

(56) References Cited

U.S. PATENT DOCUMENTS

| 2010/0281685 A1* | 11/2010 | Hori | H01M 10/4285 29/761 |
| 2013/0133184 A1* | 5/2013 | Bacci | H01G 9/0029 29/730 |
| 2016/0240887 A1* | 8/2016 | Hatta | H01M 10/4257 |

FOREIGN PATENT DOCUMENTS

| CN | 107681202 A | 2/2018 |
| CN | 109786853 A | 5/2019 |

(Continued)

OTHER PUBLICATIONS

International Search Report for PCT Application No. PCT/CN2021/115846, dated May 17, 2022.

(Continued)

*Primary Examiner* — Cynthia H Kelly
*Assistant Examiner* — Omar M Kekia
(74) *Attorney, Agent, or Firm* — Ladas & Parry LLP

(57) ABSTRACT

Provided are a battery winding method, a battery winding system, a battery and an electrical device. The battery winding method includes: winding; photographing a picture of a current winding layer; acquiring position data of a first point and of a second point according to the picture of the current winding layer, converting the position data of the first point to obtain the converted position data of a converted first point using a preset conversion matrix corresponding to the current winding layer based on the number of the current winding layers and calculating data of displacement between the first and second electrode plates based on the converted position data of the converted first point and the position data of the second point, and determining if the data of displacement is within a threshold value scope, if so, returning to wind a next winding layer, and if not, sending an alarm.

7 Claims, 9 Drawing Sheets

(58) Field of Classification Search
USPC .......................................................... 29/623.1
See application file for complete search history.

(56) References Cited

FOREIGN PATENT DOCUMENTS

| | | |
|---|---|---|
| CN | 213340470 U | 6/2021 |
| JP | 2006145298 A | 6/2006 |
| JP | 2007240218 A | 9/2007 |

OTHER PUBLICATIONS

Written Opinion for PCT Application No. PCT/CN2021/115846, dated May 17, 2022.
Extended European Search Report for EP Application No. 21918106.2, dated Dec. 19, 2023.

* cited by examiner

BATTERY WINDING METHOD, BATTERY WINDING SYSTEM, BATTERY AND ELECTRICAL DEVICE

CROSS REFERENCE OF RELATED APPLICATION

This application is a continuation of International Patent Application No. PCT/CN2021/115846, filed on Aug. 31, 2021, which is incorporated herein by reference in its entity.

TECHNICAL FIELD

The present application relates to the battery field, and more specifically to a battery winding method, a battery winding system, a battery and an electrical device.

BACKGROUND

Along with the continuous development of battery technologies, higher precision requirements are imposed on the manufacturing process of batteries. It is expected that factors in a plurality of aspects are taken into consideration in the manufacturing process of batteries.

SUMMARY

The present application provides a battery winding method, a battery winding system, a battery and an electrical device, enhancing manufacturing precision in the manufacturing process of batteries to obtain high-precision battery products.

According to a first aspect, a battery winding method is provided, including: a winding step, a photographing step, a position data acquiring step, a converting step and a determining step. The winding step includes winding a membrane layer composite of a to-be-manufactured battery on a winding shaft, the membrane layer composite includes a first electrode plate, a first diaphragm, a second electrode plate and a second diaphragm which are laminated in turn. The photographing step includes taking a picture of a current winding layer using a photographing module which is arranged at a fixed position each time the membrane layer composite is wound on the winding shaft by a circle, the picture of the current winding layer includes a first area and a second area which parallel to each other in a first direction perpendicular to the winding shaft, the first area shows the first electrode plate which is not wound on the winding shaft yet, and the second area shows the second electrode plate which is already wound on the winding shaft. The position data acquiring step includes acquiring position data of a first point in the first area and acquiring position data of a second point in the second area according to the photographed picture of the current winding layer, the first point is the middle point of an edge of the first electrode plate in parallel with the first direction, and the second point is the middle point of an edge of the second electrode plate in parallel with the first direction. The converting step includes converting, based on the number of the current winding layers, the position data of the first point using a preset conversion matrix corresponding to the current winding layer to obtain converted position data of the converted first point. The determining step includes calculating data of displacement between the first electrode plate and the second electrode plate based on the converted position data of the converted first point and the position data of the second point, determining whether the data of displacement is within a threshold value scope, returning to the winding step to execute winding of the next layer when the data of displacement is within a threshold value scope, and sending an alarm when the data of displacement is out of the threshold value scope.

According to the technical solution of the embodiment of the present application, when the membrane layer composite of the to-be-manufactured battery is wound on the winding shaft, the current winding layer is photographed each time a winding layer is wound to obtain the picture of the current winding layer, and the position data of the middle point, namely the first point, of the edge of the first electrode plate in parallel with the first direction and the position data of the middle point, namely the second point, of the edge of the second electrode plate in parallel with the first direction are acquired from the picture of the current winding layer. Since the membrane layer composite has a certain thickness, in the process of winding the membrane layer composite on the winding shaft, the thickness of an wound object formed by winding the membrane layer composite gradually increases, the first electrode plate moves away from the photographing module and the second electrode plate moves close to the photographing module, thus generating influences on the positions of the first electrode plate and the second electrode plate in the picture. That is, the position data of the first point of the first electrode plate and the second point of the second electrode plate acquired from the picture includes errors arising from thickness changes due to winding of the membrane layer composite. Thereupon, the position data of the first point of the first electrode plate is converted into the converted position data of the converted first point using the preset conversion matrix to eliminate errors arising from thickness changes due to winding of the membrane layer composite. Then, the data of displacement between the first electrode plate and the second electrode plate is calculated based on the converted position data of the converted first point of the first electrode plate and the position data of the second point of the second electrode plate. In this way, the obtained data of displacement in each of the winding layers is not influenced by errors arising from thickness changes due to winding of the membrane layer composite.

In addition, for each of the winding layers, picture processing and data processing methods are adopted to eliminate errors arising from thickness changes due to winding of the membrane layer composite using the conversion matrix, so that such errors can be quickly eliminated without generating influences on the efficiency of the entire winding process and ensuring efficient and accurate winding.

In some embodiments, the conversion matrix is preset by the following steps of: first, selecting a reference battery, photographing each of winding layers of the reference battery using the photographing module, where the same as the picture of the current winding layer obtained at the photographing step, the picture of each of the winding layers of the reference battery includes the first area and the second area; second, acquiring the position data of the first point in the first area and the position data of the second point in the second area according to the picture of each of the winding layers of the reference battery, just like the position data acquiring step; third, measuring an actual distance of displacement between the first electrode plate and the second electrode plate in each of the winding layers, correcting the second point based on the actual distance of displacement to obtain the corrected position data of the corrected second point; fourth, setting a to-be-calculated conversion matrix including to-be-calculated parameters for each of the winding layers, and establishing a relation of correspondence between the position data of the first point and the corrected position data of the corrected second point based on the to-be-calculated conversion matrix; and fifth, selecting, according to the number of the to-be-calculated parameters in the to-be-calculated conversion matrix, a corresponding number of points in the first area, including the first point, and selecting a corresponding number of points including the corrected second point, corresponding to the points selected in the first area, in the second area, and importing the selected points into the relation to calculate the to-be-calculated parameters of the to-be-calculated conversion matrix to obtain the conversion matrix.

According to the above-mentioned steps for setting the conversion matrix, each of the winding layers of the reference battery is photographed using the same photographing module as that for photographing each of the winding layers of the to-be-manufactured battery, and then just like the position data acquiring step, the position data of the first point of the first electrode plate and the second point of the second electrode plate is acquired from the photographed pictures. Here, the position data of the first point of the first electrode plate and the second point of the second electrode plate includes errors arising from thickness changes due to winding of the membrane layer composite. At this time, the actual distance of displacement between the first electrode plate and the second electrode plate of each of the winding layers is not acquired from the picture, but practically measured. The position data of the second point of the second electrode plate is corrected using the actual distance of displacement to obtain the corrected position data of the corrected second point. The to-be-calculated conversion matrix including to-be-calculated parameters is set for each of the winding layers, and the relation of correspondence between the position data of the first point and the corrected position data of the corrected second point is established based on the to-be-calculated matrix. The position data of a plurality of points are imported into the relation to calculate the to-be-calculated parameters in the to-be-calculated conversion matrix, obtaining the conversion matrix. For each of the winding layers, the actual distance of displacement between the first electrode plate and the second electrode plate is practically measured and used to correct the position data of the second point of the second electrode plate, and the position data of the first point of the first electrode plate and the second point of the second electrode plate includes errors arising from thickness changes due to winding of the membrane layer composite, so the to-be-calculated conversion matrix used in the relation between the first point and the corrected point includes influences arising from thickness of the winding layer, and the conversion matrix obtained through the to-be-calculated conversion matrix can convert (correspond) the first point to the second point which is free of errors arising from thickness changes due to winding of the membrane layer composite and is not displaced.

In some embodiments, at the fourth step, the relation established based on the to-be-calculated conversion matrix $F_i'$ is $P_n^T F_i' Q_n = 0 \ldots$ (1), where $P_n$ represents the position data $(x_{Pn}, y_{Pn}, 1)$ of eight points including the first point, selected in the first area in the picture of an $i^{th}$ winding layer of the reference battery, n is a natural number and $0 \leq n \leq 7$, $x_{Pn}$ represents a coordinate in the first direction, $y_{Pn}$ is a coordinate in the second direction perpendicular to the first direction; $P_n^T$ is the transposition of $P_n$; $Q_n$ represents the position data $(x_{Qn}, y_{Qn}, 1)$ of eight points including the corrected second point, corresponding to $P_n$, selected in the second area in the picture of the $i^{th}$ winding layer of the reference battery, n is a natural number and $0 \leq n \leq 7$, $x_{Qn}$ represents a coordinate in the first direction, and $y_{Qn}$ represents a coordinate in the second direction; $F_i'$ is $$\begin{bmatrix} A11' & A12' & A13' \\ A21' & A22' & A23' \\ A31' & A32' & 1 \end{bmatrix}$$

which includes eight to-be-calculated parameters, A11', A12', A13', A21', A22', A23', A31' and A32', representing a relationship of converting $P_n$ into $Q_n$ in the $i^{th}$ winding layer, and i represents the number of the winding layers; $P_n$ and $Q_n$ are acquired according to the photographed picture of each of the winding layers of the reference battery, and $P_n$ and $Q_n$ are imported into the relation $P_n^T F_i' Q_n = 0$ to calculate the to-be-calculated parameters in $F_i'$ of each of the winding layers.

At the fourth step for setting the conversion matrix, the relation established for the ith winding layer of the reference battery based on the to-be-calculated matrix $F_i'$ is $P_n^T F_i' Q_n = 0$, where, $F_i'$ includes eight to-be-calculated parameters, A11', A12', A13', A21', A22', A23', A31' and A32', and is set as a three-order matrix $$\begin{bmatrix} A11' & A12' & A13' \\ A21' & A22' & A23' \\ A31' & A32' & 1 \end{bmatrix}.$$

Then, eight groups of $P_n$ and $Q_n$ are required to calculate the eight to-be-calculated parameters in $F_i'$. $P_n$ includes the first point of the first electrode plate in the picture of the reference battery, and the other seven points selected in the first area where the first electrode plate is located. $Q_n$ includes the corrected second point of the second electrode plate in the picture of the reference battery, and the other seven points, corresponding to the other seven points selected in the first area, selected in the second area where the second electrode plate is located. Therefore, for the $i^{th}$ winding layer, the to-be-calculated parameters in the to-be-converted matrix $F_i'$ which converts (corresponds) the first point into the corrected second point can be calculated to obtain the conversion matrix $F_i$.

In some embodiments, at the converting step, the conversion matrix is used to establish a formula (2), $P^T F_i Q = 0 \ldots$ (2) which converts the position data of the first point into the converted position data of the converted first point, where P represents the position data $(x_P, y_P, 1)$ of the first point in the picture of the current winding layer photographed at the photographing step, $x_P$ represents a coordinate in the first direction, and $y_P$ represents a coordinate of the first point in the second direction perpendicular to the first direction in the picture of the current winding layer photographed at the photographing step; PT is transposition of P; Q represents the converted position data $(x_Q, y_Q, 1)$ of the first point in the picture of the current winding layer photographed at the photographing step, $x_Q$ represents a coordinate of the second point in the first direction in the picture of the current winding layer photographed at the photographing step, and $y_Q$ represents a to-be-calculated coordinate in the second direction; $F_i$ is $$\begin{bmatrix} A11 & A12 & A13 \\ A21 & A22 & A23 \\ A31 & A32 & 1 \end{bmatrix}$$

which includes eight parameters, A11, A12, A13, A21, A22, A23, A31 and A32, representing a relationship of converting P into Q in the $i^{th}$ winding layer, and i represents the number of the winding layers; $x_P$, $y_P$, $x_Q$ and $F_i$ are imported into $P^T F_i Q = 0$ to calculate $y_Q$; in the picture of the current winding layer photographed at the photographing step, a coordinate, in the second direction, in the position data of the second point is selected and set as $y_R$, and the difference between $y_Q$ and y is calculated as the data of displacement between the first electrode plate and the second electrode plate.

In the process of winding the to-be-manufactured battery, the first point of the first electrode plate acquired from the photographed picture of each of the winding layers of the to-be-manufactured battery is required to be converted into (corresponded) an ideal second point which is free of errors arising from thickness changes due to winding of the membrane layer composite and is not displaced. Thereupon, the relation $P^T F_i Q = 0$ is established, where P represents the position data of the first point, and Q represents the converted position data of the converted first point. The coordinate $y_Q$ of the ideal second point in the second direction can be calculated using the preset conversion matrix and the coordinates $x_P$, $y_P$ of the first point in the first direction and in the second direction and the coordinate $x_Q$ of the second point in the first direction acquired from the picture. Here, the coordinate $x_Q$ of the second point in the first direction is free of influences of errors and displacement arising from thickness changes due to winding of the membrane layer composite due to winding, so only the coordinate $x_Q$ of the ideal second point in the second direction needs to be calculated. At this time, the first point of the first electrode plate is already converted (corresponded) into the ideal second point of the second electrode plate. Through calculating the difference between coordinate $y_Q$ of the converted first point (the ideal second point) in the second direction and the coordinate $y_R$ of the second point in the second direction that is acquired from the picture of the winding layer, the data of displacement between the first electrode plate and the second electrode plate can be obtained without being influenced by errors arising from thickness changes due to winding of the membrane layer composite.

In some embodiments, in the picture of the current winding layer photographed at the photographing step, the first area shows the first diaphragm which is not wound on the winding shaft yet, while the second area shows the second diaphragm which is already wound on the winding shaft, and the first diaphragm and the second diaphragm respectively exceed the first electrode plate and the second electrode plate in the second direction perpendicular to the first direction; the first position data further includes position data of a third point of the first diaphragm in the first area and position data of a fourth point of the second diaphragm in the second area, where the third point of the first diaphragm is the middle point of an edge, exceeding the first electrode plate, of the first diaphragm in the picture of the current winding layer, the fourth point of the second diaphragm is the middle point of an edge, exceeding the second electrode plate, of the second diaphragm in the picture of the current winding layer; and according to the data of displacement between the first electrode plate and the second electrode plate, the first point, the second point, the third point and the fourth point are marked on a straight line where coordinates in the first direction X are located to obtain the data of displacement among the first electrode plate, the first diaphragm, the second electrode plate and the second diaphragm.

In the process of winding the to-be-manufactured battery, the position data of the middle point, namely the third point, of the edge, exceeding the first electrode plate, of the first diaphragm and the middle point, namely the fourth point, of the edge, exceeding the second electrode plate, of the second diaphragm is acquired from the picture of each of the winding layer; based on the calculated data of displacement between the first electrode plate and the second electrode plate, the first point of the first electrode plate, the second point of the second electrode plate, the third point of the first diaphragm and the fourth point of the second diaphragm can be marked on the straight line where the coordinates on the first direction X are located, thus obtaining the data of displacement among the first electrode plate, the first diaphragm, the second electrode plate and the second diaphragm.

According to a second aspect, a battery winding system is provided, including: a winding shaft, a photographing module and a control portion, where the winding shaft is used to wind a membrane layer composite of a to-be-manufactured battery, the membrane layer composite includes a first electrode plate, a first diaphragm, a second electrode plate and a second diaphragm which are laminated in turn; the photographing module is arranged at an interval from the winding shaft and is used to photograph each of winding layers in the process of winding the membrane layer composite to generate a picture of a current winding layer, the picture of the current winding layer includes a first area and a second area which parallel to each other in the first direction perpendicular to the winding shaft, the first area shows the first electrode plate which is not wound on the winding shaft yet, and the second area shows the second electrode plate which is already wound on the winding shaft; the control portion is used to execute the following procedures: according to the photographed picture of the current winding layer, the position data of a first point is acquired in the first area, position data of a second point is acquired in the second area, the first point is the middle point of an edge of the first electrode plate in parallel with the first direction, and the second point is the middle point of an edge of the second electrode plate in parallel with the first direction; based on the number of the current winding layers, the position data of the first point is converted using a preset conversion matrix corresponding to the current winding layer to obtain converted position data of the converted first point; data of displacement between the first electrode plate and the second electrode plate is calculated based on the converted position data of the converted first point and the position data of the second point, whether the data of displacement is within a threshold value scope is determined, the procedure returns back to the winding step to execute winding of a next layer when the data of displacement is within the threshold value scope, and an alarm is sent when the data of displacement is out of the threshold value scope According to a third aspect, a battery is provided, where the battery winding method according to the first aspect is adopted in the manufacturing process of the battery.

According to a fourth aspect, an electrical device is provided, which includes the battery according to the third aspect, where the battery is used to supply electricity.

BRIEF DESCRIPTION OF DRAWINGS

Accompanying drawings described herein are used for further understanding of the present application and constitute a part of the present application. Exemplary embodiments and description thereof are used for interpreting the present application and should not be construed as improperly limiting the present application. In the accompanying drawings.

DETAILED DESCRIPTION

Figure 1:
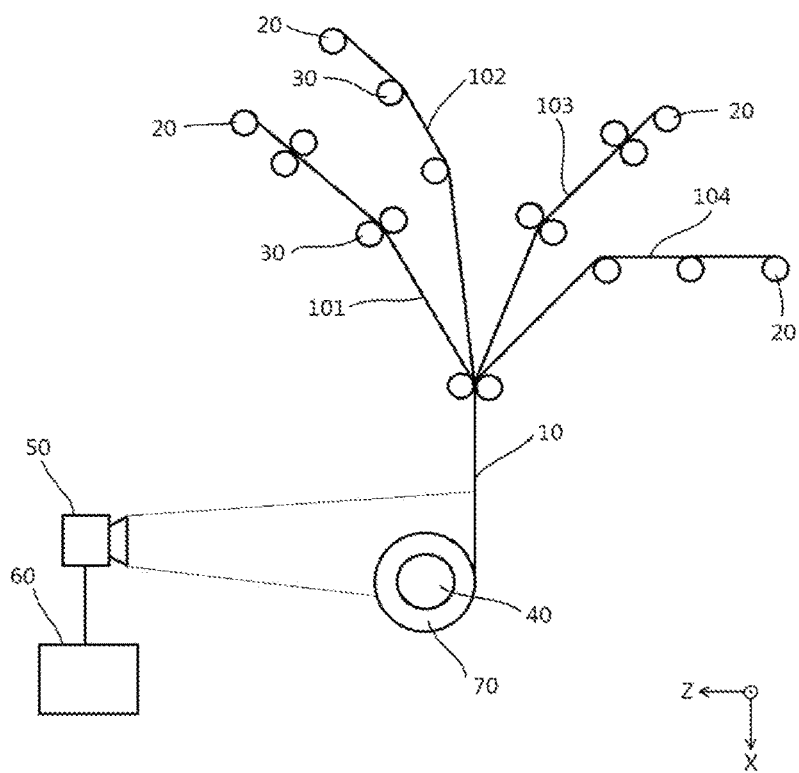
FIG. 1 is structurally schematic diagram of a battery winding system according to one embodiment of the present application.

To clarify purposes, technical solutions and advantages of the embodiments of the present application, the technical solutions in the embodiments of the present application will be clearly described with reference to accompanying drawings in the embodiments of the present application. Apparently, the described embodiments are only part of, but not all the embodiments of the present application. Based on the embodiments of the present application, all other embodiments obtained by those ordinarily skilled in the art without creative labor fall within the scope of protection of the present application.

Unless otherwise specified, all technical and science terms used in the present application have meanings understood by those ordinarily skilled in the art; terms used in the description of the present application are used for the purpose of describing specific embodiments instead of limiting the present application; and terms "comprise" and "have" as well as their any deformations in the description, claims and the above-mentioned accompanying drawings of the present application are aimed at non-exclusive inclusion. Terms "first", "second", etc. in the description, claims and the above-mentioned accompanying drawings of the present application are used for distinguishing different objects, and not for describing specific sequences or primary and secondary relationships.

"Embodiments" mentioned in the present application mean that specific characteristics, structures or features described with reference to the embodiments can be included in at least one embodiment of the present application. Such phrase at different places of the description does not necessarily refer to the same embodiments, and does not refer to independent or candidate embodiments which repel other embodiments. The embodiments described in the present application can be exP licitly and implicitly understood to be combined with other embodiments by those ordinarily skilled in the art.

In the description of the present application, it also needs to be noted that, unless otherwise clearly specified and defined, terms "installed", "connected", "connection", and "adapted connection" should be understood in a broad way, for example, the connection can be fixed connection, detachable connection or integral connection; or direct connection, or indirection connection via an intermediate, or communication between interiors of two components. Those ordinarily skilled in the art can understand the specific meanings of the above-mentioned terms in the present application upon specific situations.

The term "and/or" in the present application merely describes a correlation relationship between correlated objects, and indicates existence of three relationships, for example, A and/or B can indicate: sole existence of A, co-existence of A and B, and sole existence of B. In addition, the character "/" in the present application generally indicates an "or" relationship of the successively correlated objects.

"A plurality of" in the present application refers to two or more (inclusive); similarly, "a plurality of groups" refers to two or more groups (inclusive), and "a plurality of pieces" refers to two or more pieces (inclusive).

The battery mentioned in the embodiment of the present application refers a single physical module which includes one or a plurality of battery cells to supply higher voltage and capacitance. For example, the battery mentioned in the present application can include a battery module, a battery pack, etc.

The battery cell includes an electrode assembly and an electrolytic liquid, and the electrode assembly includes a positive electrode plate, a negative electrode plate and a diaphragm. The battery cell functions mainly by motion of metallic ions between the positive electrode plate and the negative electrode plate. The positive electrode plate includes positive current collectors and positive active-material layers; the positive active-material layer is coated on a surface of the positive current collector; the positive current collector which is not coated with the positive active-material layer protrudes out of the positive current collector coated with the positive active-material layer; and positive current collectors which are not coated with the positive active-material layer serve as a positive tab. Take lithium-ion batteries as an example. The material of the positive current collector can be aluminum, and a positive active-material can be lithium cobalt oxide, lithium iron phosphate, ternary lithium or lithium manganate, etc. The negative electrode plate includes negative current collectors and negative active-material layers; the negative active-material layer is coated on a surface of the negative current collector; the negative current collector which is not coated with the negative active-material layer protrudes out of the negative current collector coated with the negative active-material layer; and negative current collectors which are not coated with the negative active-material layer serve as a negative tab. The material of the negative current collector can be copper, and a negative active-material can be carbon, silicone, etc. To ensure passing of a large current without fusing, a plurality of positive tabs are provided and laminated together, and a plurality of negative tabs are provided and laminated together. The material of the diaphragm can be polyPropylene (PP) or polyethylene (PE), etc. In addition, the electrode assembly can be a wound structure, or a laminated structure. In this embodiment, the wound structure is adopted.

Along with the continuous development of battery technologies, higher requirements are imposed on the manufacturing process of batteries. It is expected to take factors in a plurality of aspects into consideration in the manufacturing process of batteries.

Lithium-ion batteries with advantages of light weight, small sizes, high energy densities, high power densities, high working voltages, a great many cycling times, high safety, being green, environmental friendliness, etc. are widely applied to various fields, for example, portable smart devices, electric vehicles, etc. The lithium-ion batteries mainly include wound lithium-ion batteries and laminated lithium-ion batteries. In the process of manufacturing the wound lithium-ion batteries, a positive electrode plate, and a negative electrode and a diaphragm need to be wound, and it is an ideal case that the relative positions among the positive electrode plate, the negative electrode plate and the diaphragm are not changed during winding. However, as winding proceeds, the positive electrode plate, the negative electrode plate and the diaphragm are displaced. Once the magnitude of displacement among the positive electrode plate, the negative electrode plate and the diaphragm exceeds ±0.5 mm, the battery manufactured in this way has a risk of internal short-circuits, which may result in explosion or fire. Therefore, in the battery winding process, the displacement among the positive electrode plate, the negative electrode plate and the diaphragm needs to be monitored to ensure the displacement is within a specified threshold value.

In the prior at, the positive electrode plate, the negative electrode plate and the diaphragm under winding are usually photographed, and the displacement among the positive electrode plate, the negative electrode plate and the diaphragm is determined according to the photographed picture. However, as the positive electrode plate, the negative electrode plate and the diaphragm are wound on a winding shaft layer by layer, a wound object formed by winding increases in thickness, leading to influences on the positions of the positive electrode plate, the negative electrode plate and the diaphragm in the picture, and generating errors from the actual positions.

In view of this, the present application provides a technical solution. The present application provides a battery winding method, including: a winding step, a photographing step, a position data acquiring step, a converting step and a determining step, where the winding step includes winding a membrane layer composite of a to-be-manufactured battery on a winding shaft, the membrane layer composite includes a first electrode plate, a first diaphragm, a second electrode plate and a second diaphragm which are laminated in turn; the photographing step includes taking a picture of a current winding layer using a photographing module which is arranged at a fixed position each time the membrane layer composite is wound on the winding shaft by a circle, the picture of the current winding layer includes a first area and a second area which parallel to each other in a first direction perpendicular to the winding shaft, the first area shows the first electrode plate which is not wound on the winding shaft yet, and the second area shows the second electrode plate which is already wound on the winding shaft; the position data acquiring step includes acquiring position data of a first point in the first area and acquiring position data of a second point in the second area according to the photographed picture of the current winding layer, the first point is the middle point of an edge of the first electrode plate in parallel with the first direction, and the second point is the middle point of an edge of the second electrode plate in parallel with the first direction; the converting step includes converting the position data of the first point to obtain converted position data of the converted first point using a preset conversion matrix corresponding to the current winding layer based on the number of the current winding layers; and the determining step includes calculating data of displacement between the first electrode plate and the second electrode plate based on the converted position data of the converted first point and the position data of the second point, determining whether the data of displacement is within a threshold value scope, returning to the winding step to execute winding of a next layer when the data of displacement is within the threshold value scope, and sending an alarm when the data of displacement is out of the threshold value scope.

According to the technical solution of the embodiment of the present application, when the membrane layer composite of the to-be-manufactured battery is wound on the winding shaft, the current winding layer is photographed each time a winding layer is wound to obtain the picture of the current winding layer, and the position data of the middle point, namely the first point, of the edge of the first electrode plate in parallel with the first direction and the position data of the middle point, namely the second point, of the edge of the second electrode plate in parallel with the first direction are acquired from the picture of the current winding layer. Since the membrane layer composite has a certain thickness, in the process of winding the membrane layer composite on the winding shaft, the thickness of an wound object formed by winding the membrane layer composite gradually increases, the first electrode plate moves away from the photographing module and the second electrode plate moves close to the photographing module, thus generating influences on the positions of the first electrode plate and the second electrode plate in the picture. That is, the position data of the first point of the first electrode plate and the second point of the second electrode plate acquired from the picture includes errors arising from thickness changes due to winding of the membrane layer composite. Thereupon, the position data of the first point of the first electrode plate is converted into the converted position data of the converted first point using the preset conversion matrix so as to eliminate errors arising from thickness changes due to winding of the membrane layer composite. Then, the data of displacement between the first electrode plate and the second electrode plate is calculated based on the converted position data of the converted first point of the first electrode plate and the position data of the second point of the second electrode plate. In this way, the obtained data of displacement in each of the winding layers is not influenced by errors arising from thickness changes due to winding of the membrane layer composite.

In addition, for each of the winding layers, the technical solution in the embodiment of the present application adopts picture processing and data processing methods to eliminate errors arising from thickness changes due to winding of the membrane layer composite by leverage of the conversion matrix, so that such errors can be quickly eliminated without generating influences on the efficiency of the entire winding process and ensuring efficient and accurate winding.

The present application provides a battery winding system, including: a winding shaft, a photographing module and a control portion, where the winding shaft is used to wind a membrane layer composite of a to-be-manufactured battery, the membrane layer composite includes a first electrode plate, a first diaphragm, a second electrode plate and a second diaphragm which are laminated in turn; the photographing module is arranged at an interval from the winding shaft and is used to photograph each of winding layers in the process of winding the membrane layer composite to generate a picture of a current winding layer, the picture of the current winding layer includes a first area and a second area which parallel to each other in the first direction perpendicular to the winding shaft, the first area shows the first electrode plate which is not wound on the winding shaft yet, and the second area shows the second electrode plate which is already wound on the winding shaft; the control portion is used to execute the following procedures: according to the photographed picture of the current winding layer, the position data of a first point is acquired in the first area, position data of a second point is acquired in the second area, the first point is the middle point of an edge of the first electrode plate in parallel with the first direction, and the second point is the middle point of an edge of the second electrode plate in parallel with the first direction; based on the number of the current winding layers, the position data of the first point is converted using a preset conversion matrix corresponding to the current winding layer to obtain converted position data of the converted first point; data of displacement between the first electrode plate and the second electrode plate is calculated based on the converted position data of the converted first point and the position data of the second point, whether the data of displacement is within a threshold value scope is determined, the procedure returns back to the winding step to execute winding of a next layer when the data of displacement is within the threshold value scope, and an alarm is sent when the data of displacement is out of the threshold value scope.

The present application further provides a battery, where the battery winding method of the present application is adopted in the manufacturing process of the battery.

The present application further provides an electrical device, which includes the battery according to the third aspect, where the battery is used to supply electricity.

The technical solution described in the embodiment of the present application is suitable for manufacturing wound batteries, which are applicable to equipment such as mobile phones, portable equipment, notebook computers, battery driven vehicles, electric toys, electric tools, electric vehicles, ships, vessels and space vehicles, for example, space vehicles include airplanes, rockets, space ships, etc. It needs to be understood that, the wound batteries manufactured using the technical solution described in the embodiment of the present application apply not only to the above-described equipment, but also to all equipment using the wound batteries.

For example, as shown in the structural schematic diagram of FIG. 1, a battery winding system 1 according to one embodiment of the present application includes a membrane layer composite 10, a winding roll 20, a guide roll 30 and a winding shaft 40, which are used to wind a to-be-manufactured battery.

The membrane layer composite 10 is a core component by which a battery realizes charging and discharging repeatedly. Usually, the membrane layer composite includes electrode plates and diaphragms. In some optional embodiments, two layers of electrode plates are provided, namely a first electrode plate 101 and a second electrode plate 103; and two layers of diaphragms are provided, namely a first diaphragm 102 and a second diaphragm 104. The first electrode plate 101, the first diaphragm 102, the second electrode plate 103 and the second diaphragm 104 are laminated in turn. In the manufacturing process of batteries, two layers of electrode plates and two layers of diaphragms need to be wound together.

In some optional embodiments, four winding rolls 20 are provided; the first electrode plate 101, the first diaphragm 102, the second electrode plate 103 and the second diaphragm 104 are respectively placed at the four winding rolls 20, and free ends thereof are respectively released from the four winding rolls 20.

In some optional embodiments, the guide roll 30 can be arranged independently or by pair; and the free ends of the first electrode plate 101, the first diaphragm 102, the second electrode plate 103 and the second diaphragm 104 penetrate through a plurality of guide rolls 30 first, and then are guided to the winding shaft 40 in a laminated way.

In some optional embodiment, the winding shaft 40 can rotate by the effect of a power mechanism (not shown in the figures) to wind the first electrode plate 101, the first diaphragm 102, the second electrode plate 103 and the second diaphragm 104 which are laminated together, namely the membrane layer composite 10, thereon.

Optionally, the winding shaft 40 is comprised of two semicircular clamps, and the two clamps are joined together to form the cylindrical winding shaft 40. When winding is required, the belt-like first electrode plate 101, first diaphragm 102, second electrode plate 103 and second diaphragm 104 are drawn to the winding shaft 40, and the free ends, drawn to the winding shaft 40, of the first electrode plate 101, the first diaphragm 102, the second electrode plate 103 and the second diaphragm 104 are fixed by the winding shaft 40, that is, the free ends of the four are clamped between the two semicircular clamps. Then, a motor serving as the power mechanism drives the winding shaft 40 to rotate to draw the first electrode plate 101, the first diaphragm 102, the second electrode plate 103 and the second diaphragm 104 which are laminated together to the winding shaft 40 and wind the same on the winding shaft 40.

Due to the processing technologies of the electrode plates and the diaphragms and position changes of the electrode plates and the diaphragms during conveying, there may be a risk of displacement between the electrode plates and between the electrode plates and the diaphragms. To avoid such displacement, the relative positions between the electrode plates and between the electrode plates and the diaphragms need to be detected in time. Usually, the relative positions between the electrode plates and between the electrode plates and the diaphragms area are detected in real time by taking edges of the electrode plates (or diaphragms) as a reference.

In some optional embodiments, as shown in FIG. 1, the battery winding system 1 further includes a photographing module 50 and a control portion 60.

In some optional embodiments, the photographing module 50 and the winding shaft 40 are fixedly arranged at a certain distance in a third direction Z (as described hereinafter, the first direction X is perpendicular to the axial direction of the winding shaft 40, the second direction Y is the axial direction of the winding shaft 40, and the third direction Z is perpendicular to the first direction X and the second direction Y) to photograph the membrane layer composite 10 during winding so as to generate pictures. Spacing the photographing module 50 from the winding shaft 40 by a certain distance can ensure that, in the winding process, the photographing module 50 can photograph at least the edges, in parallel with the first direction X, of the first electrode plate 101, the first diaphragm 102, the second electrode plate 103 and the second diaphragm 104. The first direction X is perpendicular to the axial direction of the winding shaft 40. The second direction Y is the axial direction of the winding shaft 40, perpendicular to the first direction X. The third direction Z is perpendicular to the first direction X and the second direction Y.

In some optional embodiments, the control portion 60 is in a communication connection with the photographing module 50 to receive pictures photographed by the photographing module 50 and to process the pictures so as to calculate the positions of the first electrode plate 101, the first diaphragm 102, the second electrode plate 103 and the second diaphragm 104, thereby obtaining data of displacement between the electrode plates and between the electrode plates and the diaphragms.

Figure 2:
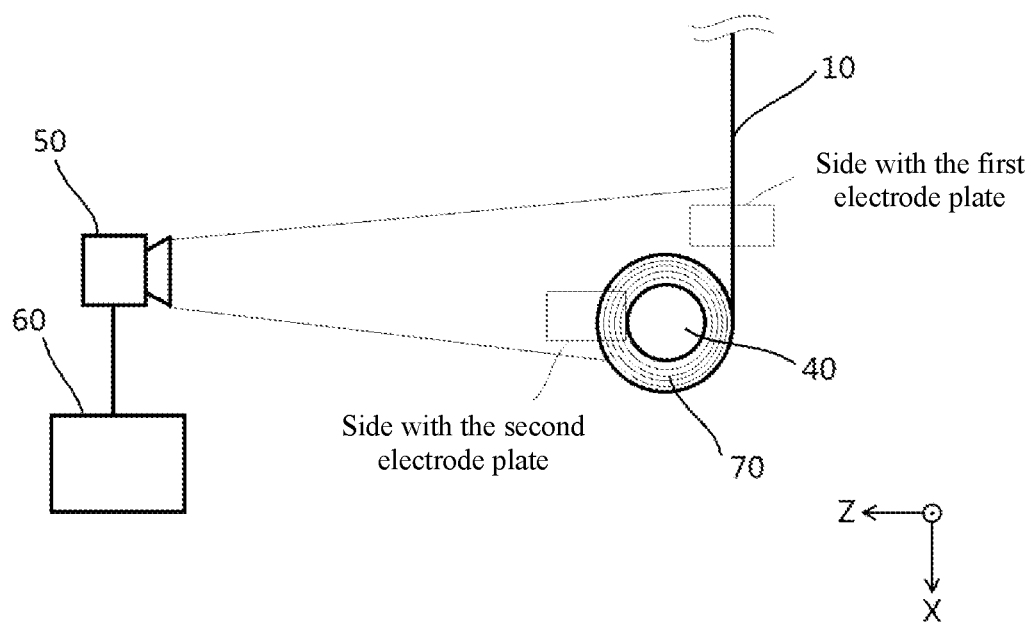
FIG. 2 is a diagram of influences arising from the thickness of an wound object formed by winding of a membrane layer composite when a photographing module in a battery winding system according to one embodiment of the present application photographs.

However, since the membrane layer composite 10 has a certain thickness, the thickness of a wound object 70 formed by winding the membrane layer composite 10 gradually increases in the process of winding the membrane layer composite on the winding shaft 40. As shown in FIG. 2, the thickness of the wound object 70 increases gradually in the third direction Z where the photographing module 50 and the winding shaft 40 are spaced. As the thickness of the wound object 70 increases, the side with the first electrode plate 101 within the photographing scope of the photographing module 50 gradually moves away from the photographing module 50 in the third direction Z, and the side with the second electrode plate 103 gradually moves close to the photographing module 50 in the third direction Z. The photographed picture cannot visually reflect the position change in the third direction Z, but the position change in the third direction Z can influence the positions of the first electrode plate 101 and the second electrode plate 103 in the second direction Y in the picture, that is, the position data of the first electrode plate 101 and the second electrode plate 103 obtained from the picture includes errors arising from the thickness changes due to winding of the membrane layer composite 10.

Figure 3:
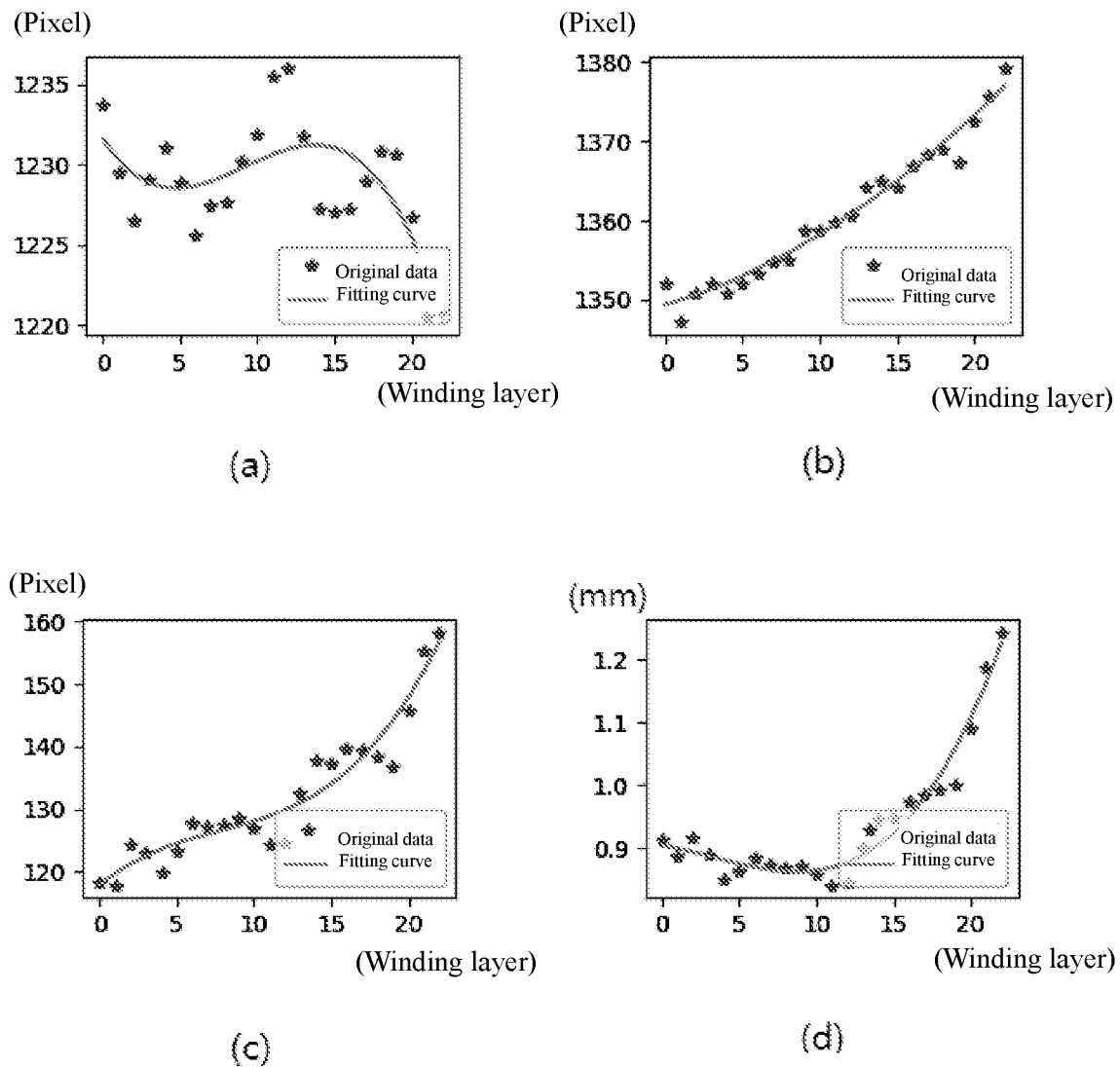
FIG. 3 is diagram of displacement between a first electrode plate and a second electrode plate when a battery winding method according to one embodiment of the present application is not used.

To describe the influences of errors arising from the thickness changes due to winding of the membrane layer composite 10, the applicant photographed each of winding layers of the membrane layer composite 10 wound on the winding shaft 40 using the photographing module 50, extracted the position data (pixel coordinates) of the first electrode plate 101 and the second electrode plate 103 in the photographed pictures, and drew a graph as shown in FIG. 3 using the position data.

In FIG. 3, FIG. 3(a) represents pixel coordinates of the middle point, in the second direction Y, of an edge L1 of the first electrode plate 101 in parallel with the first direction X in each of the winding layers, where the transverse axis represents the number of the winding layers, and the longitudinal axis represents the pixel coordinates in the second direction Y; FIG. 3(b) represents pixel coordinates of the middle point, in the second direction Y, of an edge L2 of the second electrode plate 103 in parallel with the first direction X in each of the winding layers, where the transverse axis represents the number of the winding layers, and the longitudinal axis represents the pixel coordinates in the second direction Y; FIG. 3(c) represents the absolute value of the difference (data of displacement) between the pixel coordinates of the middle point, in the second direction Y, of the edge L1 of the first electrode plate 101 in parallel with the first direction X and the pixel coordinates of the middle point, in the second direction Y, of the edge L2 of the second electrode plate 103 in parallel with the first direction X, where the transverse axis represents the number of the winding layers, and the longitudinal axis represents the pixel coordinates in the second direction Y; and FIG. 3(d) is a graph obtained after the longitudinal axis of FIG. 3(c) is converted into an actual distance, where the transverse axis represents the number of the winding layers, and the longitudinal axis represents the actual distance.

According to FIG. 3, it can be seen that, as the number of the winding layers grows, the thickness of the wound object 70 increases, the pixel coordinates of the middle point, in the second direction Y, of the edge L1 of the first electrode plate 101 reduce dramatically, the pixel coordinates of the middle point, the second direction Y, of the edge L2 of the second electrode plate 103 gradually increase, and the distance between the middle point of the edge L1 of the first electrode plate 101 and the middle point of the edge L2 of the second electrode plate 103 in the second direction Y dramatically increases after a 13th winding layer. In the winding process, as the number of the winding layers increases, the magnitude of actual displacement between the first electrode plate 101 and the second electrode plate 103 is influenced by a plurality of factors and usually fluctuates. It can be seen that the result of FIG. 3 is influenced by errors arising due to winding of the membrane layer composite 10. Therefore, whether the displacement between the first electrode plate 101 and the second electrode plate 103 exceeds the threshold value may be incorrectly determined.

In addition, since the first diaphragm 102 and the second diaphragm 104 are respectively located on the side with the first electrode plate 101 and the side with the second electrode plate 103 within the photographing scope of the photographing module 50, the positions thereof in the picture are also influenced for the same reason by errors arising from the thickness changes due to winding of the membrane layer composite 10.

Therefore, according to a battery winding method in one embodiment of the present application, by eliminating errors arising from the thickness changes due to winding of the membrane layer composite 10 for each of the winding layers, high-precision winding can be executed in the battery manufacturing process to manufacture batteries with high safety. According to the battery winding method, picture and data processing is executed by the control portion 60.

Figure 4:
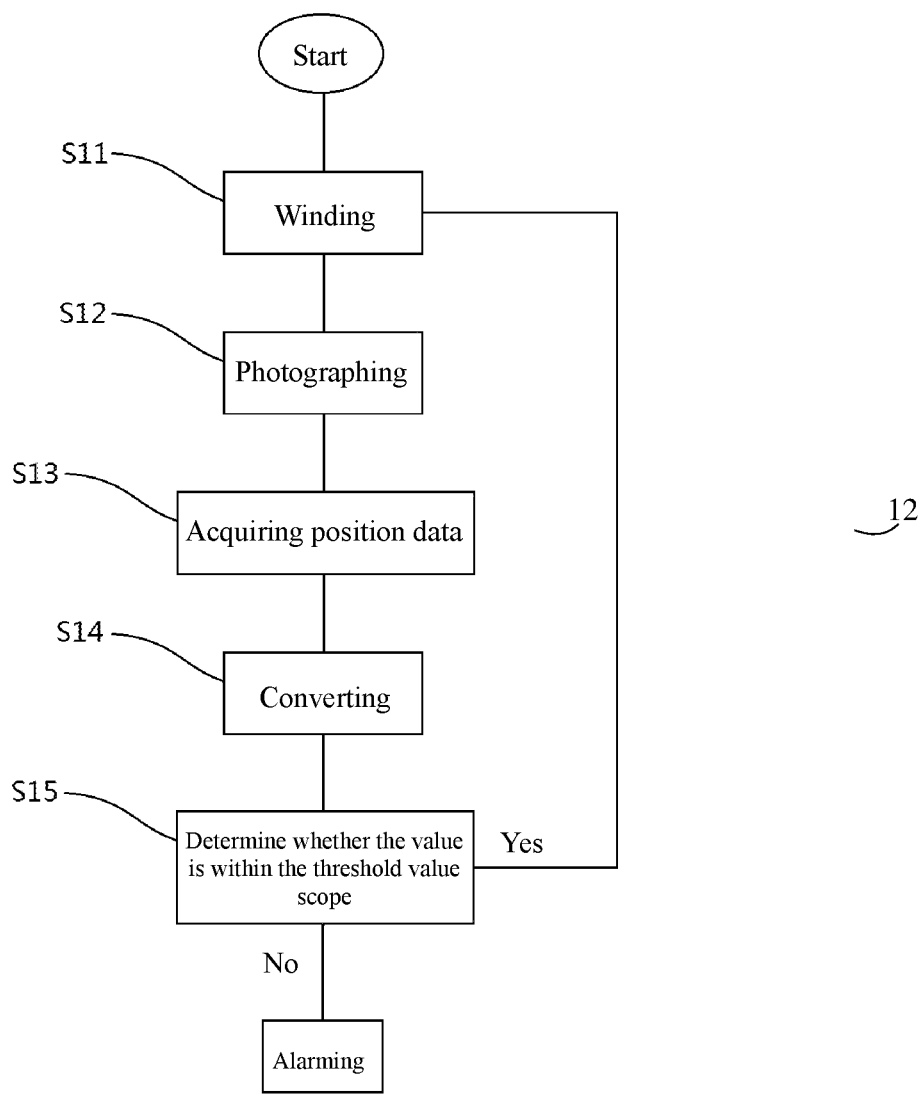
FIG. 4 is a flowchart of a battery winding method according to one embodiment of the present application.
Figure 5:
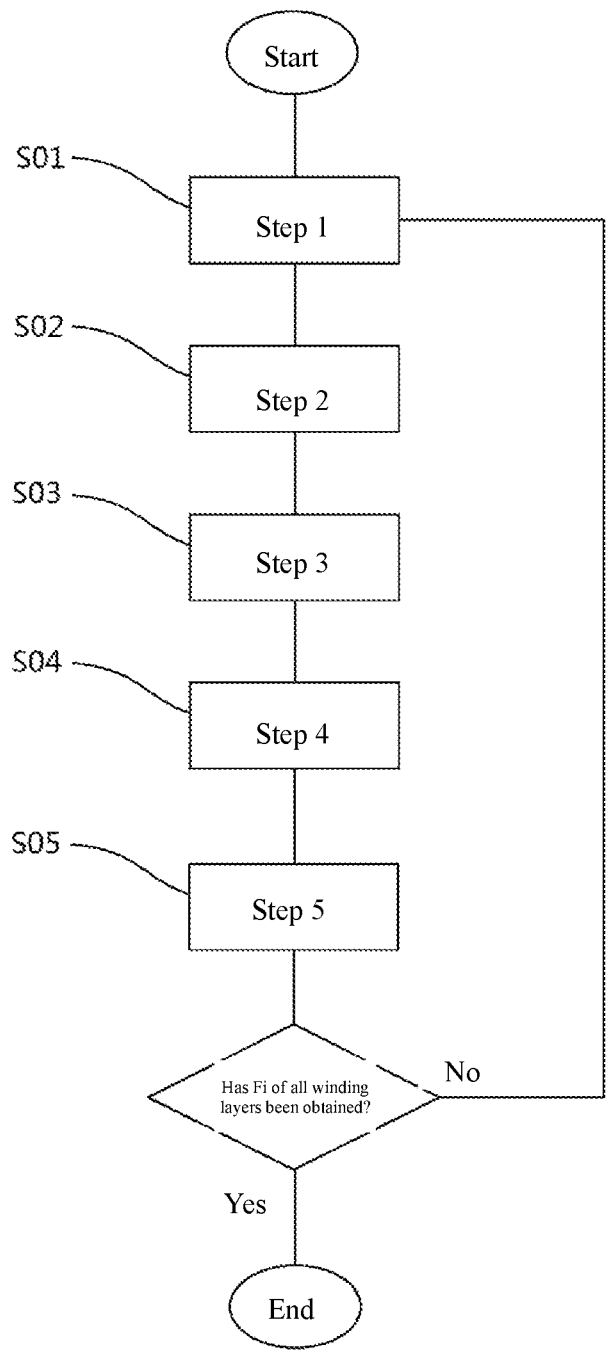
FIG. 5 is a flowchart of steps for presetting a conversion matrix according to one embodiment of the present application.
Figure 6A:
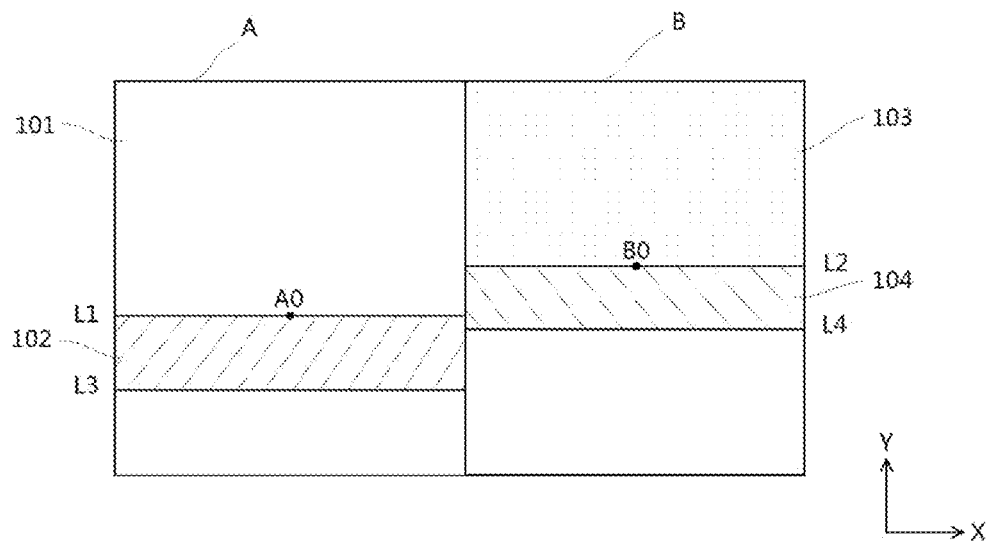
FIG. 6A is a diagram of a first point and a second point selected to calculate to-be-calculated parameters of a to-be-calculated conversion matrix according to one embodiment of the present application.
Figure 6B:
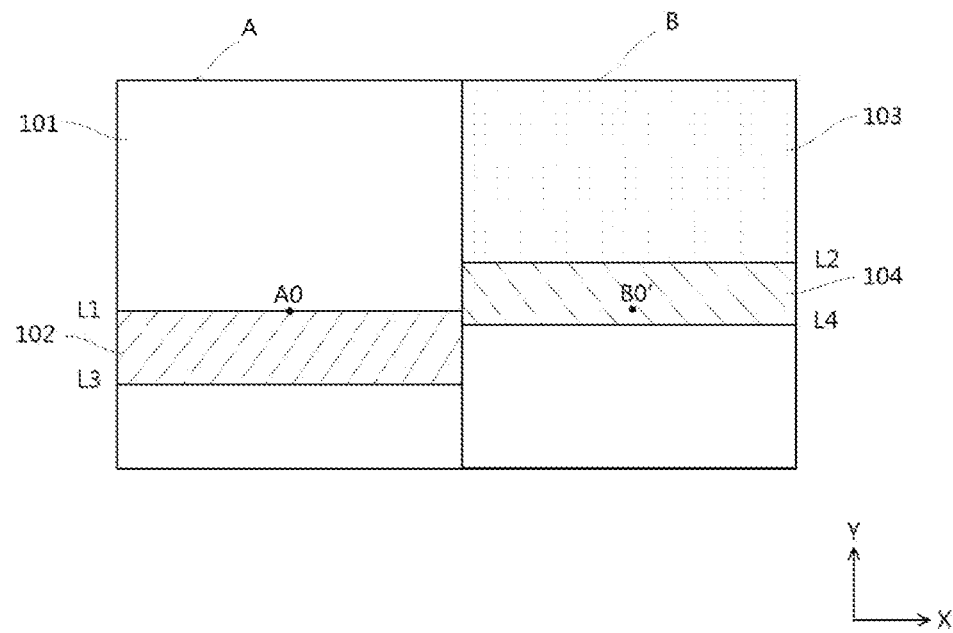
FIG. 6B is a diagram of a first point and a corrected second point selected to calculate to-be-calculated parameters of a to-be-calculated conversion matrix according to one embodiment of the present application.
Figure 6C:
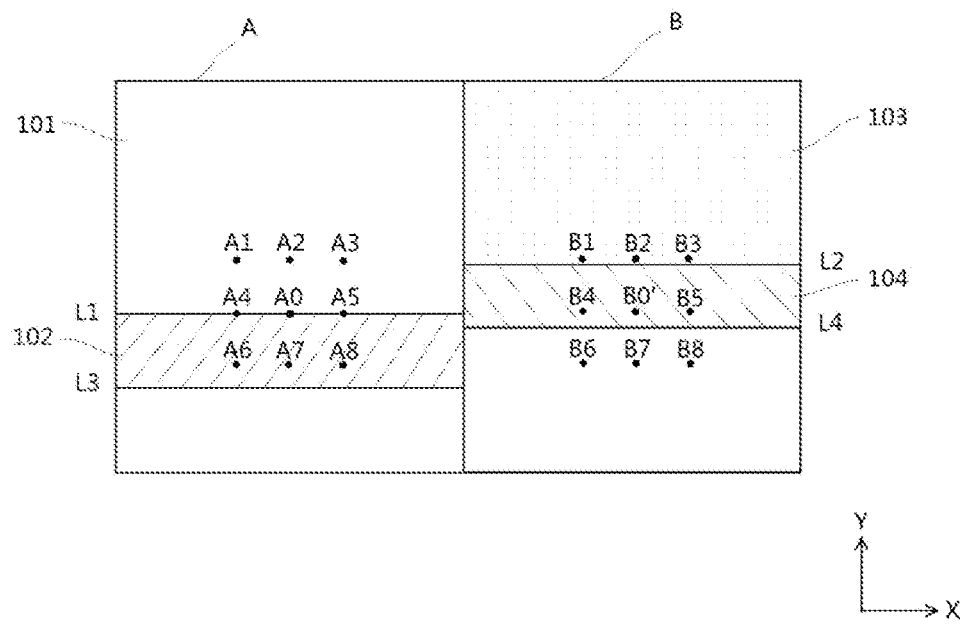
FIG. 6 C is a diagram of a point in a first area and a corresponding point in a second area selected during calculation of to-be-calculated points of a to-be-calculated conversion matrix according to embodiment of the present application.
Figure 7A:
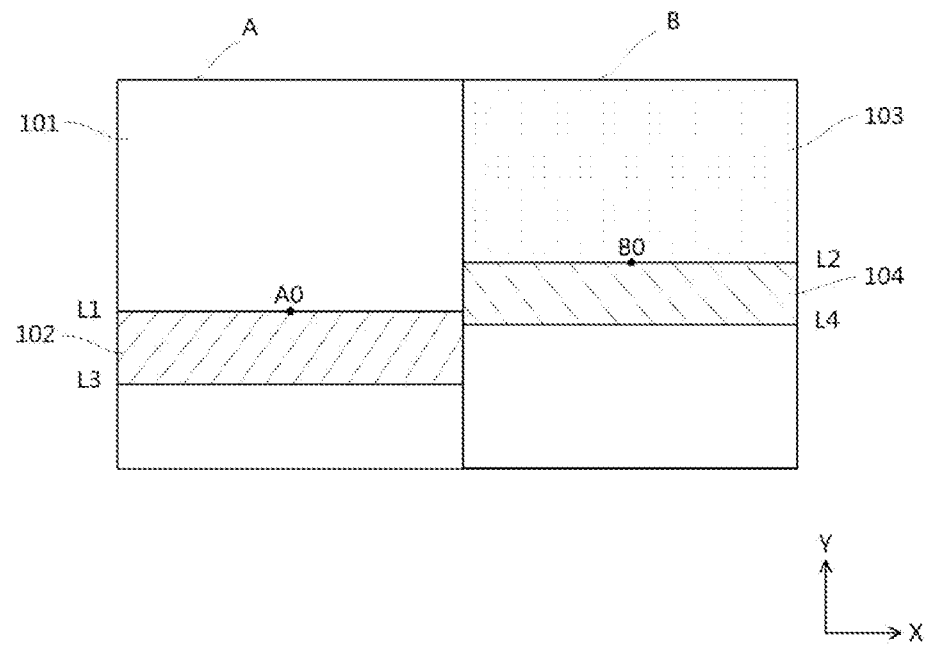
FIG. 7A is a diagram of a first point and a second point selected at a position data acquiring step of a battery winding method according to one embodiment of the present application.
Figure 7B:
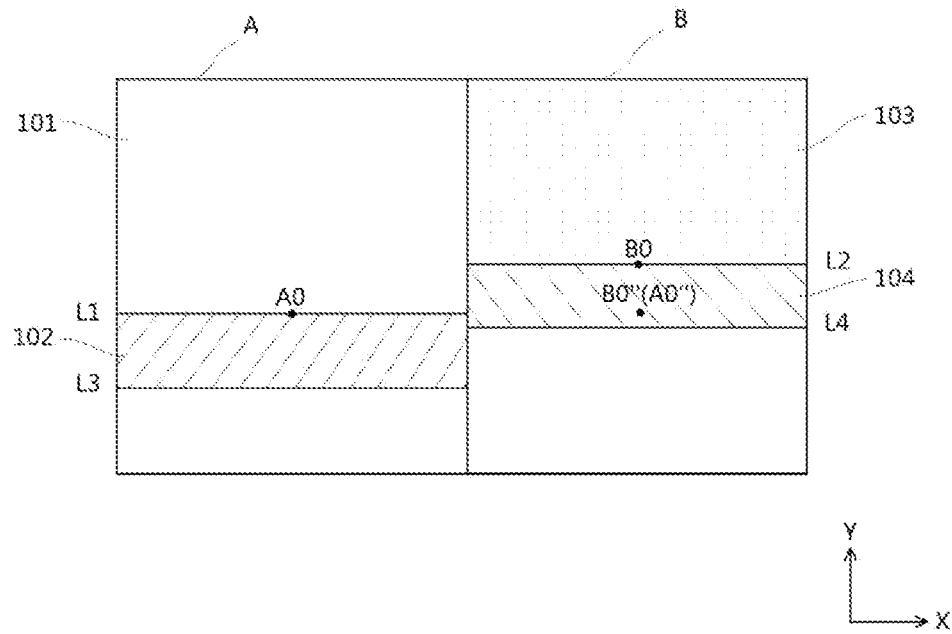
FIG. 7B is a diagram of a converted first point and a second point at a converting step and a calculating step of a battery winding method according to one embodiment of the present application.
Figure 8A:
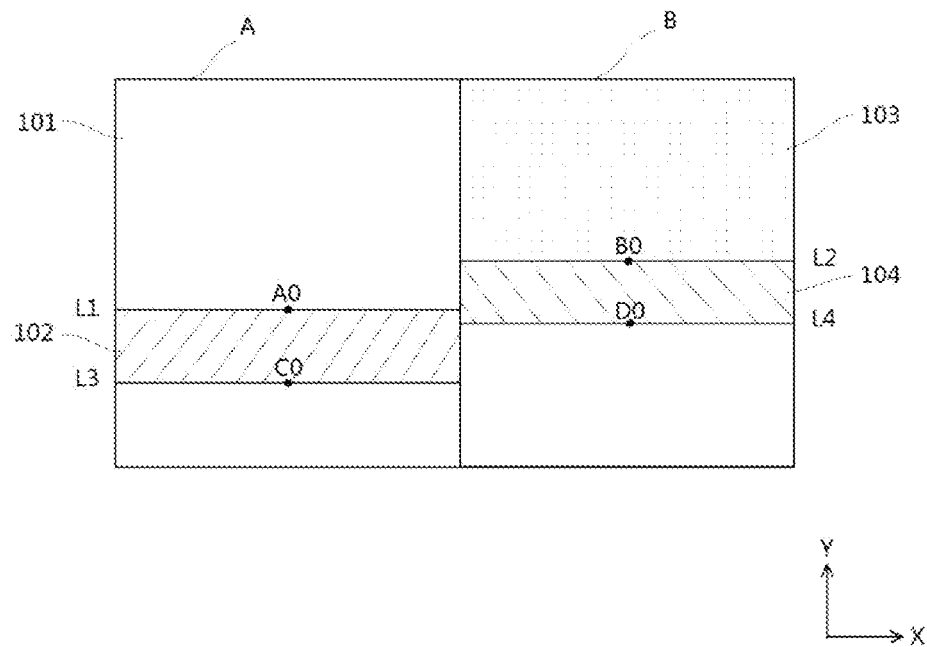
FIG. 8A is a diagram of a first point, a second point, a third point and a fourth point selected in a battery winding method according to one embodiment of the present application.
Figure 8B:
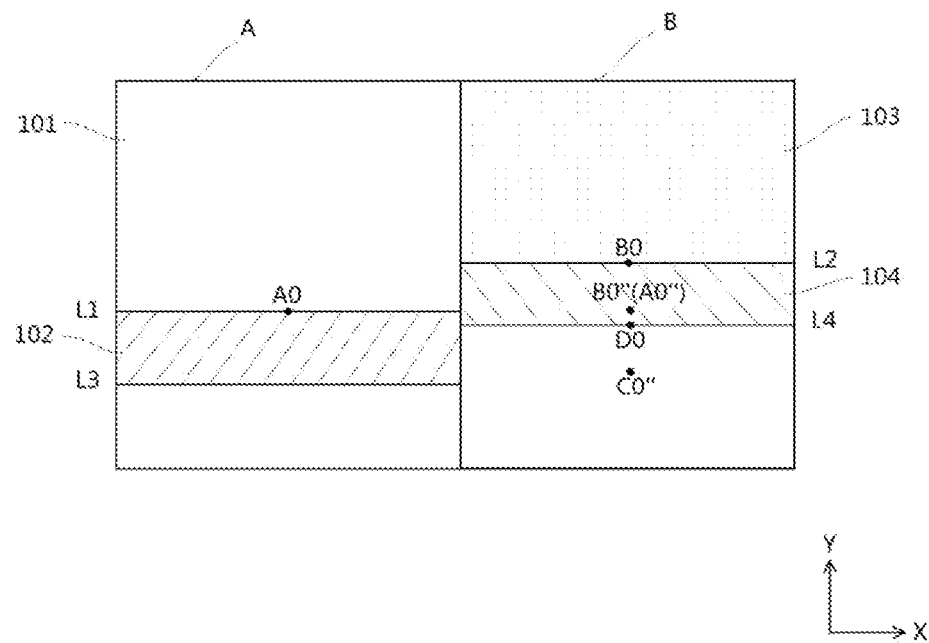
FIG. 8B is a diagram of a first point, a second point, a third point and a fourth point marked on a straight line where coordinates in a first direction are located in a battery winding method according to one embodiment of the present application.

FIG. 4 is a flowchart of a battery winding method according to one embodiment of the present application. FIG. 5 is a flowchart of steps for presetting a conversion matrix $F_i$ according to one embodiment of the present application. FIG. 6A is a diagram of a first point A0 and a second point B0 selected during calculation of parameters of a to-be-calculated conversion matrix $F_i'$ according to one embodiment of the present application. FIG. 6B is a diagram of a first point A0 and a corrected second point B0' selected during calculation of to-be-calculated parameters of a to-be-calculated conversion matrix $F_i'$ according to one embodiment of the present application. FIG. 6C is a diagram of a point in a first area A and a corresponding point in a second area B selected during calculation of to-be-calculated parameters of a to-be-calculated conversion matrix $F_i'$ according to one embodiment of the present application. FIG. 7A is a diagram of a first point A0 and a second point B0 selected at a position data acquiring step S13 of a battery winding method according to one embodiment of the present application. FIG. 7B is a diagram of a converted first point A0' and a second point B0 at a converting step S14 and a calculating step of a battery winding method according to one embodiment of the present application. FIG. 8A is a diagram of a first point A0, a second point B0, a third point C0 and a fourth point D0 selected in a battery winding method according to one embodiment of the present application. FIG. 8B is a diagram of a first point A0, a second point B0, a third point C0 and a fourth point D0 marked on a straight line where coordinates in a first direction X are located in a battery winding method according to one embodiment of the present application.

In some optional embodiments, as shown in FIG. 4, the battery winding method includes a winding step S11, a photographing step S12, the position data acquiring step S13, the converting step S14 and a determining step S15. At the winding step S11, a membrane layer composite 10 of a to-be-manufactured battery is wound on a winding shaft 40, where the membrane layer composite 10 includes a first electrode plate 101, a first diaphragm 102, a second electrode plate 103 and a second diaphragm 104 which are laminated in turn. At the photographing step S12, each time the membrane layer composite 10 is wound on the winding shaft 40 by a cycle, the photographing module 50 arranged at a fixed position is used to take a picture of a current winding layer, where the picture of the current winding layer includes a first area A and a second area B which parallel to each other in a first direction X perpendicular to the winding shaft 40, the first area A shows the first electrode plate 101 which is not wound on the winding shaft 40 yet, and the second area B shows the second electrode plate 103 which is already wound on the winding shaft 40. At the position data acquiring step S13, according to the photographed picture of the current winding layer, the position data of a first point A0 is acquired from the first area A and the position data of a second point B0 is acquired from the second area B, where the first point A0 is the middle point of an edge L1 of the first electrode plate 101 in parallel with the first direction X, and the second point B0 is the middle point of an edge L2 of the second electrode plate 103 in parallel with the first direction X. At the converting step S14, based on the number i of the current winding layers, a preset conversion matrix $F_i$ corresponding to the current winding layer is used to convert the position data of the first point A0 to obtain the converted position data of the converted first point A0". At the determining step S15, based on the converted position data of the converted first point A0" and the position data of the second point B0, data of displacement between the first electrode plate 101 and the second electrode plate 103 is calculated; whether the data of displacement is within a threshold value scope is determined; the operation returns to the winding step S11 to start winding of a next winding layer when the data of displacement is within the threshold value scope; and an alarm is given when the data of displacement is not within the threshold value scope.

When the membrane layer composite 10 of the to-be-manufactured battery is wound on the winding shaft 40, the current winding layer is photographed each time a winding layer is wound to obtain the picture of the current winding layer, and as shown in FIG. 7A, the position data of the middle point, namely the first point A0, of the edge L1 of the first electrode plate 101 in parallel with the first direction X and the position data of the middle point, namely the second point B0, of the edge L2 of the second electrode plate 103 in parallel with the first direction X are acquired from the picture of the current winding layer. Since the membrane layer composite 10 has a certain thickness, in the process of the winding the membrane layer composite on the winding shaft 40, the thickness of an wound object 70 formed by winding the membrane layer composite 10 gradually increases, the first electrode plate moves away from the photographing module and the second electrode plate moves close to the photographing module, generating influences on the positions of the first electrode plate 101 and the second electrode plate 103 in the second direction Y in the picture. That is, the position data of the first point A0 of the first electrode plate 101 and the second point B0 of the second electrode plate 103 includes errors arising from thickness changes due to winding of the membrane layer composite 10. Thereupon, the preset conversion matrix $F_i$ is used to convert the position data of the first point A0 of the first electrode plate 101 into the converted position data of the converted first point A0". Specifically, the position data of an ideal second point B0" is acquired by corresponding the first point A0 of the first electrode plate 101 to the ideal second point B0" (the converted first point A0") of the second electrode plate 103, thereby eliminating errors arising from thickness changes due to winding of the membrane layer composite 10. Then, the data of displacement between the first electrode plate 101 and the second electrode plate 103 is calculated based on the converted position data of the converted first point A0" of the first electrode plate 101 and the position data of the second point B0 of the second electrode plate 103. In this way, the obtained data of displacement in each winding layer is not influenced by errors arising from thickness changes due to winding of the membrane layer composite 10.

In addition, for each of the winding layers, picture processing and data processing methods are adopted to eliminate errors arising from thickness changes due to winding of the membrane layer composite 10 by leverage of the conversion matrix $F_i$, so that such errors can be quickly eliminated without influencing the efficiency of the entire winding process and ensuring efficient and accurate winding.

In some optional embodiments, as shown in FIG. 5, the conversion matrix $F_i$ is preset by a first step S01, a second step S02, a third step S03, a fourth step S04 and a fifth step S05. At the first step S01, a reference battery is selected, and each of winding layers of the reference battery is photographed using the photographing module 50, where as shown in FIG. 6A to FIG. 6C, the same as the picture of the current winding layer obtained at the photographing step S12, the picture of each of the winding layers of the reference battery includes the first area A and the second area B. At the second step S02, the position data of the first point A0 in the first area A and the position data of the second point B0 in the second area B are acquired according the picture of each of the winding layers of the reference battery, just like the position data acquiring step S13. At the third step S03, the actual distance of displacement between the first electrode plate 101 and the second electrode plate 103 in each of the winding layer is measured, and the second point B0 is corrected according to the actual distance of displacement to obtain the corrected position data of the corrected second point B0. At the fourth step S04, a to-be-calculated conversion matrix $F_i'$ including to-be-calculated parameters is set for each of the winding layers, and a relation (namely the formula (1) below) of correspondence between the position data of the first point A0 and the corrected position data of the corrected second point B0 is established based on the to-be-calculated matrix $F_i'$. At the fifth step S0S, according to the number of the to-be-calculated parameters of the to-be-calculated conversion matrix $F_i'$, a corresponding number of points including the first point A0 are selected in the first area A, and a corresponding number of points including the corrected second point B0, corresponding to the points in the first area A, are selected in the second area B; and then, the selected points are imported into the relation to calculate the parameters of the conversion matrix $F_i'$ to obtain the conversion matrix $F_i$.

According to the above-mentioned steps S01-S05 for setting the conversion matrix each of the winding layers of the reference battery is photographed using the photographing module 50 the same as that for photographing each of the winding layers of the to-be-manufactured battery, and then like the position data acquiring step S13, the position data of the first point A0 of the first electrode plate 101 and the second point B0 of the second electrode plate 103 is acquired from the photographed pictures. Here, the position data of the first point A0 of the first electrode plate 101 and the second point B0 of the second electrode plate 103 includes errors arising from thickness changes due to winding of the membrane layer composite 10. At this time, the actual distance of displacement between the first electrode plate 101 and the second electrode plate 103 in each of the winding layers is not acquired from the pictures, but practically measured. The position data of the second point B0 of the second electrode plate 103 is corrected using the actual distance of displacement to obtain the position data of the corrected second point B0'. The to-be-calculated conversion matrix $F_i'$ including the to-be-calculated parameters is set for each of the winding layers, and the relation of correspondence between the position data of the first point A0 and the corrected position data of the corrected second point B0' is established based on the to-be-calculated matrix $F_i'$. The position data of a plurality of points are imported into the relation to calculate the to-be-calculated parameters in the to-be-calculated conversion matrix $F_i'$, thus obtaining the conversion matrix $F_i$.

For each of the winding layers, the actual distance of displacement between the first electrode plate 101 and the second electrode plate 103 is practically measured and used to correct the position data of the second point B0 of the second electrode plate 103, and the position data of the first point A0 of the first electrode plate 101 and the second point B0 of the second electrode plate 103 includes errors arising from thickness changes due to winding of the membrane layer composite 10, so the to-be-calculated conversion matrix $F_i'$ used in the relation $F_i$ between the first point A0 and the corrected second point B0' includes influences arising from thickness of the winding layer, and the conversion matrix $F_i$ obtained through the to-be-calculated conversion matrix $F_i'$ can convert (correspond) the first point A0 into the second point B0 which is free of errors arising from thickness changes due to winding of the membrane layer composite 10 and is not displaced.

In some optional embodiments, the actual distance of displacement between the first electrode plate 101 and the second electrode plate 103 in each of the winding layers is measured using, for example, an image measurement instrument. The image measurement instrument is widely applied to measurement of angles, diameters, radii, distances between points and lines, eccentricity between two circles, and spacing between two points, etc., and can accurately measure actual sizes.

In some optional embodiments, at the fourth step S04, the relation established based on the to-be-calculated conversion matrix $F_i'$ is:

$$P_n^T F_i' Q_n = 0 \qquad (1).$$

Where, $P_n$ represents the position data $(x_{Pn}, y_{Pn}, 1)$ of eight points including the first point A0 selected in the first area A in the picture of an $i^{th}$ winding layer of the reference battery, n is a natural and $0 \leq n \leq 7$, $x_{Pn}$ is a coordinate in the first direction X, $y_{Pn}$ is a coordinate in the second direction Y perpendicular to the first direction X, and $P_n^T$ is transposition of $P_n$. $Q_n$ represents the position data $(x_{Qn}, y_{Qn}, 1)$ of the eight points including the corrected second point B0', corresponding to $P_n$, selected in the second area B in the picture of the $i^{th}$ winding layer of the reference battery, n is a natural number and $0 \leq n \leq 7$, $x_{Qn}$ is a coordinate in the first direction X, and $y_{Qn}$ is a coordinate in the second direction Y. $F_i'$ is $$\begin{bmatrix} A11' & A12' & A13' \\ A21' & A22' & A23' \\ A31' & A32' & 1 \end{bmatrix},$$

including eight to-be-calculated parameters, A11', A12', A13', A21', A22', A23', A31' and A32', representing a relation of converting $P_n$ into $Q_n$ in the $i^{th}$ winding layer. i represents the number of winding layers. $P_n$ and $Q_n$ are acquired from the photographed picture of each of winding layers of the reference battery, and $P_n$ and $Q_n$ are imported into the relation $P_n^T F_i' Q_n = 0$ to calculate the to-be-calculated parameters in $F_i'$ of each of the winding layers.

At the fourth step S04 for setting the conversion matrix $F_i$, the relation established for the $i^{th}$ winding layer of the reference battery based on the to-be-calculated matrix $F_i'$ is $P_n^T F_i' Q_n = 0$, where, $F_i'$ includes eight to-be-calculated parameters, A11', A12', A13', A21', A22', A23', A31' and A32', and is set as a three-order matrix $$\begin{bmatrix} A11' & A12' & A13' \\ A21' & A22' & A23' \\ A31' & A32' & 1 \end{bmatrix}.$$

Thereupon, at least eight groups of $P_n$ and $Q_n$ are required to calculate the eight to-be-calculated parameters in $F_i'$. $P_n$ includes the first point A0 of the first electrode plate 101 in the picture of the reference battery, and the other seven points selected in the first area where the first electrode plate 101 is located. $Q_n$ includes the corrected second point B0' of the second electrode plate 103 in the picture of the reference battery, and the other seven points, corresponding to the other seven points selected in the first area A, selected in the second area B where the second electrode plate is located. Therefore, for the $i^{th}$ winding layer, the to-be-calculated parameters in the to-be-converted matrix $F_i'$ which converts (corresponds) the first point A0 to the corrected second point B0' can be calculated to obtain the conversion matrix $F_i$.

In some optional embodiments, in the first area A, nine points A0-A8 including the first point A0 are established in a square shape by taking the first point A0 as the center. The actual distances among the points A0-A8 in the first direction X and in the second direction Y are defined as d mm, and the distances d mm are converted into the pixel sizes in the picture and marked in the picture. $P_n$ includes any eight of the points A0-A8 including the first point A0 selected in this way.

In some optional embodiments, in the second area B, nine points B0'-B8 including the corrected second point B0' are established in a square shape by taking the corrected second point B0' as the center. Similarly, the actual distances among the points B0'-B8 in the first direction X and in the second direction Y are defined as d mm, and the distances d mm are converted into the pixel sizes in the picture and marked in the picture. Q includes any eight of points B0'-B8 including the corrected second point B0' selected in this way.

In some optional embodiments, the method for selecting eight points including the first point A0 in the first area A can be drawing a circle with a radius of r mm by taking the first point A0 as the center and selecting the other seven points on the circumference at an equal interval or rationally.

In some optional embodiments, the method for selecting eight points including the corrected second point B0' from the second area B can be drawing a circle with a radius of r mm is drawn by taking the corrected second point B0' as the center and selecting the other seven points on the circumference at an equal interval or rationally.

In some optional embodiments, the method for selecting the eight points including the first point A0 in the first area A is required to be the same as that for selecting the eight points including the corrected second point B0' in the second area B. That is, eight points including the first point A0 are selected in the first area A, and eight points including the corrected second point B0', corresponding to the eight points selected in the first area A, are selected in the second area B. Here, "corresponding" refers to correspondence of the actual distance or actual position relation.

In some optional embodiments, at the converting step S14, the conversion matrix $F_i$ is used to establish a formula (2) which converts the position data of the first point A0 into the converted position data of the converted first point A0", $$P^T F_i Q = 0 \quad (2).$$

Where, P represents the position data (xP,yP,1) of the first point A0 in the picture of the current winding layer photographed at the photographing step S12, $x_P$ is a coordinate in the first direction X, $y_P$ is a coordinate of the first point A0 in the second direction Y perpendicular to the first direction X in the picture of the current winding layer photographed at the photographing step S12, and $P^T$ is transposition of P. Q represents the converted position data $(x_Q, y_Q, 1)$ of the first point A0 in the picture of the current winding layer photographed at the photographing step S12, $x_Q$ is a coordinate of the second point B0 in the first direction X in the picture of the current winding layer photographed at the photographing step S12, and $y_Q$ is a to-be-calculated coordinate in the second direction Y. $F_i$ is $$\begin{bmatrix} A11 & A12 & A13 \\ A21 & A22 & A23 \\ A31 & A32 & 1 \end{bmatrix},$$

including eight parameters, A11, A12, A13, A21, A22, A23, A31 and A32, representing a relation of converting P into Q in the $i^{th}$ winding layer. i represents the number of winding layers. $x_P$, $y_P$, x and $F_i$ are imported into $P^T F_i Q = 0$ to calculate $y_Q$. In the picture of the current winding layer photographed at the photographing step S12, the coordinate of the position data of the second point B0 in the second direction Y is selected and set as $y_R$, and the difference between $y_Q$ and $y_R$ is calculated as the data of displacement between the first electrode plate 101 and the second electrode plate 103.

In the process of winding the to-be-manufactured battery, the first point A0 of the first electrode plate 101 selected in the photographed picture of each of the winding layers of the to-be-manufactured battery is required to be converted (corresponded) into an ideal second point B0" which is free of errors arising from thickness changes due to winding of the membrane layer composite 10 and is not displaced. Thereupon, the relation $P^T F_i Q = 0$ is established, where P represents the position data of the first point A0, and Q represents the converted position data of the converted first point A0", namely the ideal second point B0". The coordinate $y_Q$ of the ideal second point B0" in the second direction Y can be calculated using the preset conversion matrix and coordinates $x_P$, $y_P$ of the first point A0 in the first direction X and the second direction Y and the coordinate $x_Q$ of the second point B0 in the first direction X acquired from the picture. Here, the coordinate $x_Q$ of the second point B0 in the first direction X is free of influences of errors and displacement arising from thickness changes due to winding of the membrane layer composite 10, so only the coordinate $y_Q$ of the ideal second point B0" in the second direction Y needs to be calculated. At this time, the first point A0 of the first electrode plate 101 is already converted (corresponded) into the ideal second point B0" of the second electrode plate 103. Through the difference between the coordinate $y_Q$ of the converted first point A0" (the ideal second point B0") in the second direction Y and the coordinate $y_R$ of the second point B0 in the second direction Y obtained from the picture of the winding layer, the data of displacement between the first electrode plate 101 and the second electrode plate 103 can be obtained without the influencing on the errors arising from thickness changes due to winding of the membrane layer composite 10.

In addition, $P_n$ is $(x_{Pn}, y_{Pn}, 1)$, $Q_n$ is $(x_{Qn}, y_{Qn}, 1)$, P is $(x_P, y_P, 1)$, and Q is $(x_Q, y_Q, 1)$. The coordinates actually acquired from the picture are only coordinates in the first direction X and in the second direction Y, and among $P_n$, $Q_n$, P and Q, only the former two are actually included. However, to enhance precision, it is set that the conversion matrix $F_i$ includes eight parameters, A11, A12, A13, A21, A22, A23, A31 and A32, so $F_i$ is set as a 30-order matrix $$\begin{bmatrix} A11 & A12 & A13 \\ A21 & A22 & A23 \\ A31 & A32 & 1 \end{bmatrix},$$

and correspondingly, the to-be-calculated matrix $F_i'$ is $$\begin{bmatrix} A11' & A12' & A13' \\ A21' & A22' & A23' \\ A31' & A32' & 1 \end{bmatrix}.$$

To calculate the parameters in the 3-order to-be-calculated matrix $F_i'$ to obtain the conversion matrix $F_i$, 1 is added as the third item to each of $P_n$, $Q_n$, P and Q.

In some optional embodiments, in the picture of the current winding layer photographed at the photographing step S12, the first area A shows the first diaphragm 102 which is not wound on the winding shaft 40 yet, while the second area B shows the second diaphragm 104 which is already wound on the winding shaft 40, and the first diaphragm 102 and the second diaphragm 104 respectively exceed the first electrode plate 101 and the second electrode plate 103 in the second direction Y perpendicular to the first direction X; first position data further includes position data of a third point C0 of the first diaphragm 102 in the first area A and position data of a fourth point D0 of the second diaphragm 104 in the second area B, where the third point C0 of the first diaphragm 102 is the middle point of an edge L3, exceeding the first electrode plate 101, of the first diaphragm 102 in the picture of the current winding layer, the fourth point D0 of the second diaphragm 104 is the middle point of an edge L4, exceeding the second electrode plate 103, of the second diaphragm 104 in the picture of the current winding layer; and according to the data of displacement between the first electrode plate 101 and the second electrode plate 103, the first point A0, the second point B0, the third point C0 and the fourth point D0 are marked on a straight line where the coordinates in the first direction X are located to obtain the data of displacement among the first electrode plate 101, the first diaphragm 102, the second electrode plate 103 and the second diaphragm 104.

In the process of winding the to-be-manufactured battery, the position data of the middle point, namely the third point C0, of the edge L3, exceeding the first electrode plate 101, of the first diaphragm 102 and the middle point, namely the fourth point D0, of the edge L4, exceeding the second electrode plate 103, of the second diaphragm 104 is acquired from the picture of each of the winding layer; based on the calculated data of displacement between the first electrode plate 101 and the second electrode plate 103, the first point A0 of the first electrode plate 101, the second point B0 of the second electrode plate 103, the third point C0 of the first diaphragm 102 and the fourth point D0 of the second diaphragm 104 can be marked on the straight line where the coordinates in the first direction X are located, such that the data of displacement among the first electrode plate 101, the first diaphragm 102, the second electrode plate 103 and the second diaphragm 104 can be calculated.

In addition, it needs to be noted that, it is possible that the edge of the membrane layer composite 10 does not strictly parallel to the first direction X (which means being not perpendicular to the winding shaft) in the winding process. This is one of the reasons of displacement between the electrode plates and between the electrode plates and the diaphragms. Therefore, "the edge in parallel with the first direction X" refers to an edge which does not strictly, but approximately parallel to the first direction X. The threshold value of the displacement between the first electrode plate and the second electrode plate is ±0.5 mm, which is very small, so that "the edge in parallel with the first direction X" is an edge in parallel with the first direction X when observed with naked eyes.

In addition, coordinates mentioned herein can be pixel coordinates acquired from the pictures, or actual coordinates converted from the pixel coordinates.

The flowchart of the battery winding method in some optional embodiments will be described below.

First, the conversion matrix $F_i$ is preset.

A wound battery is selected as a reference battery and then disassembled, and each of winding layers thereof is photographed using a photographing module 50.

As shown in FIG. 6A, in the photographed picture of an $i^{th}$ winding layer of the reference battery, the middle point of an edge L1, in parallel with a first direction X, of a first electrode plate 101 in a first area A is selected as a first point A0. Moreover, the middle point of an edge L2, in parallel with the first direction X, of a second electrode plate 103 in a second area B is selected as a second point B0.

Then, as shown in FIG. 6B, the actual distance of displacement (the distance in a second direction Y) between the first electrode plate 101 and the second electrode plate 103 in the $i^{th}$ winding layer of the reference battery is measured using an image measurement instrument, and is used to correct the second point B0 to obtain the corrected second point B0'.

Next, as shown in FIG. 6C, in the first area A, nine points A0-A8 including the first point A0 are established in a square shape by taking the first point A0 as the center. The actual distances among the points A0-A8 in the first direction X and in the second direction Y are d mm, and the distances d mm are converted into the pixel sizes in the picture and marked as A1-A8. Moreover, in the second area B, nine points B0'-B8 including the corrected second point B0' are established in a square shape by taking the corrected second point B0' as the center. Similarly, the actual distances among the points B0'-B8 in the first direction X and in the second direction Y are d mm, and the distances d mm are converted into the pixel sizes in the picture and marked as B1-B8. Thus, A0-A8 and corresponding B0'-B8 are obtained.

Next, $P_n^T F_i' Q_n = 0$ is established based on the to-be-calculated conversion matrix $F_i'$ including to-be-calculated parameters. $P_n(x_{Pn}, y_{Pn}, 1)$ represents the position data of any eight of points A0-A8 including A0, and $Q_n(x_{Qn}, y_{Qn}, 1)$ represents the position data of any eight of points B0'-B8 including B0'. $F_i'$ $$\begin{bmatrix} A11' & A12' & A13' \\ A21' & A22' & A23' \\ A31' & A32' & 1 \end{bmatrix},$$

including eight to-be-calculated parameters, A11', A12', A13', A21', A22', A23 ', A31' and A32'. Therefore, seven corresponding groups of points are selected from A1 to A8 and from B1 to B8, and together with A0 and B0', imported into $P_n^T F_i' Q_n = 0$ to calculate eight to-be-calculated parameters of the $F_i'$. $F_i$ is the conversion matrix of the $i^{th}$ winding layer, which can convert the first point A0 into the ideal second point B0' in the winding process of the to-be-manufactured battery.

After the to-be-calculated parameters of the corresponding to-be-calculated conversion matrix $F_i'$ of each of the winding layers are calculated, the step of presetting the conversion matrix $F_i$ ends. The preset conversion matrix $F_i$ will be applied to the winding process of the to-be-manufactured battery.

In the winding process of the to-be-manufactured battery, first, the current winding layer is photographed using the photographing module 50 each time a winding layer is wound.

As shown in FIG. 7A, in the photographed picture of the current winding layer of the to-be-manufactured battery, the middle point of the edge L1, in parallel with the first direction X, of the first electrode plate 101 in the first area A is selected as the first point A0. Moreover, the middle point of the edge L2, in parallel with the first direction X, of the second electrode plate 103 in a second area B is selected as the second point B0.

Next, as shown in FIG. 7B, the first point A0 is converted into an ideal second point B0" using the conversion matrix based on $P^T F_i Q=0$. $P(x_P, y_P, 1)$ A represents the position data of the first point A0, and Q $(x_Q, y_Q, 1)$ represents the position data of the ideal second point B0".

Since the displacement between the first electrode plate 101 and the second electrode plate 103 exits only in the second direction Y, the coordinate of the second point B0 in the second direction Y is set as $y_R$. The difference between $y_Q$ and $y_R$ is calculated to obtain the data of displacement between the first electrode plate 101 and the second electrode plate 103.

In some optional embodiments, using the data of displacement between the first electrode plate 101 and the second electrode plate 103, the first point A0, the second point B0 and the fourth point D0 are marked on the straight line where the coordinates in the first direction X are located to calculate the data of displacement among the first electrode plate 101, the first diaphragm 102, the second electrode plate 103 and the second diaphragm 104.

As shown in FIG. 8A, in the first area A, the middle point of the edge L3, exceeding the first electrode plate 101, of the first diaphragm 102 is selected as the third point C0 of the first diaphragm 102. Moreover, in the second area B, the middle point of the edge L4, exceeding the second electrode plate 103, of the second diaphragm 104 is selected as the fourth point D0 second diaphragm 104. Since the first point A0 and the third point C0 are both located on the straight line where the coordinate $x_P$ in the first direction X is located, it is possible that the first point A0 and the third point C0 are only displaced in the second direction Y. Moreover, since the second point B0 and the fourth point D0 are both located on the straight line where the coordinate $x_Q$ in the first direction X is located, it is possible that the second point B0 and the fourth point D0 are only displaced in the second direction Y.

As shown in FIG. 8B, the ideal second point B0" converted from the first point A0 by the conversion matrix $F_i$ and the second point B0 are marked on the straight line where the coordinates in the first direction X are located. Then, according to the position relationship between the first point A0 and the third point C0, the third point C0 is marked on the straight line where the coordinate of the ideal second point B0" in the first direction X is located to obtain C0". Thus, the first point A0, the second point B0 and the fourth point D0 can be marked on the straight line where the coordinates in the first direction X are located to visually and comprehensively show the magnitude of displacement, so that the data of displacement among the first electrode plate 101, the first diaphragm 102, the second electrode plate 103 and the second diaphragm 104 can be calculated.

Figure 9:
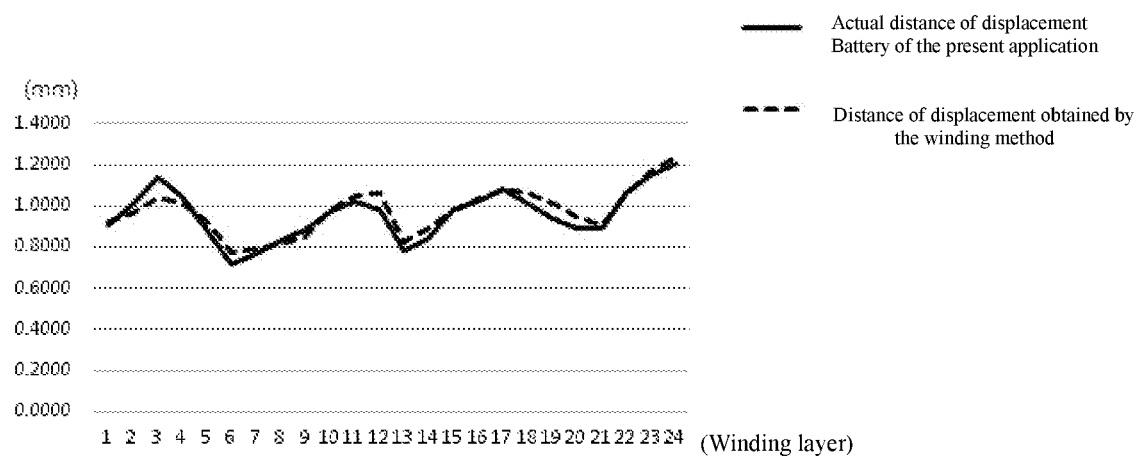
FIG. 9 is an effect diagram of a battery winding method according to one embodiment of the present application.

FIG. 9 is an effect diagram of a battery winding method according to one embodiment of the present application. In FIG. 9, the transverse axis represents the number of the winding layers, the longitudinal axis represents the actual distance, the solid line represents the actual distance of displacement between the first electrode plate 101 and the second electrode plate 103, and the dotted line represents the distance of displacement between the first electrode plate 101 and the second electrode plate 103 obtained through conversion of the position data using the battery winding method. As shown in FIG. 9, the difference between the solid line and the dotted line is less than 0.2 mm, far less than the required threshold value ±0.5 mm.

Therefore, the battery winding method of the present application can eliminate errors arising from the thickness changes due to winding of the membrane layer composite, improving manufacturing precision and capable of obtaining high-precision battery products.

Finally, it needs to be noted that: the above-mentioned embodiments are merely used to describe the technical solution of the present application instead of limiting the same; despite of detailed description of the present application with reference to the above-mentioned embodiments, those ordinarily skilled in the art should understood that, modifications to the technical solutions of the above-mentioned embodiments or equivalent replacements of some of technical characteristics can be made, and the technical solutions corresponding to such modifications or replacements essentially fall within the spirit and concept of the technical solutions of various embodiments of the present application.

What is claimed is:

1. A battery winding method, comprising:
    winding a membrane composite of a to-be manufactured battery on a winding shaft, the membrane composite comprising a first electrode plate, a first diaphragm, a second electrode plate and a second diaphragm, which are laminated in turn;
    each time the membrane composite is wound on the winding shaft by one cycle, acquiring a picture of a current winding layer of the membrane composite by a photographing module arranged at a fixed position, the picture of the current winding layer comprising a first area and a second area which are parallel to each other in a first direction perpendicular to the winding shaft, the first area showing the first electrode plate which is not wound on the winding shaft yet, and the second area showing the second electrode plate which is already wound on the winding shaft;
    acquiring position data of a first point in the first area and position data of a second point in the second area according to the picture of the current winding layer, the first point being a middle point of an edge of the first electrode plate in parallel with the first direction, and the second point being a middle point ° lan edge of the second electrode plate in parallel with the first direction;
    converting the position data of the first point to obtain converted position data of a converted first point using a preset conversion matrix corresponding to the current winding layer based on the number of the current winding layers;
    calculating data of displacement between the first electrode plate and the second electrode plate based on the converted position data of the converted first point and the position data of the second point;
    determining whether the data of displacement is within a threshold value scope; and
    winding a next layer of the membrane composite when the data of displacement is within the threshold value scope, or
    sending an alarm when the data of displacement is not within the threshold value scope.

2. The battery winding method according to claim 1, wherein the conversion matrix is preset in a process that comprises:
    selecting a reference battery, and photographing each of the winding layers of the reference battery by the photographing module, wherein the same as the picture of the current winding layer obtained at the photographing step, the picture of each of the winding layers of the reference battery also comprises a first area and a second area;

acquiring position data of a first point in the first area and position data of a second point in the second area according the picture of each of the winding layers oldie reference battery, just like the position data acquiring step;

measuring an actual distance of displacement between the first electrode plate and the second electrode plate in each of the winding layer, and correcting the second point based on the actual distance of displacement to obtain corrected position data of a corrected second point;

setting a to-be-calculated conversion matrix comprising to-be-calculated parameters for each of the winding layers, and establishing a relation of correspondence between the position data of the first point and the corrected position data of the corrected second point based on the to-be-calculated matrix; and selecting, according to the number of the to-be-calculated parameters in the to-be-calculated conversion matrix, a corresponding number of points including the first point in the first area and a corresponding number of points including the corrected second point, corresponding to the points in the first area, in the second area, and importing the selected points into the relation to calculate the parameters of the conversion matrix to obtain the conversion matrix.

3. The battery winding method according to claim 2, wherein the relation established based on the to-be-calculated conversion matrix is:

$$P_n^T F_i' Q_n = 0 \qquad (1),$$

wherein $P_n$ is the position data $(x_{P_n}, y_{P_n}, 1)$ of eight points including the first point selected in the first area in the picture of an $i^{th}$ winding layer of the reference battery, n is a natural and $0 \leq n \leq 7$, $x_{P_n}$ is a coordinate in the first direction, $y_{P_n}$ is a coordinate in a second direction perpendicular to the first direction, and $P_n^T$ is transposition of $P_n$;

$Q_n$ is the position data $(x_{Q_n}, y_{Q_n}, 1)$ of eight points including the corrected second point, corresponding to $P_n$, selected in the second area in the picture of the $i^{th}$ winding layer of the reference battery, n is a natural number and $0 \leq n \leq 7$, $x_{Q_n}$ is a coordinate in the first direction, and $y_{Q_n}$ is a coordinate in the second direction;

$F_i'$ is a matrix $$\begin{bmatrix} A11' & A12' & A13' \\ A21' & A22' & A23' \\ A31' & A32' & 1 \end{bmatrix},$$

comprising eight to-be-calculated parameters, A11', A12', A13', A21', A22', A23' A31' and A32', representing a relation of converting Pn into Qn in the $i^{th}$ winding layer, i represents the number of winding layers; and $P_n$ and $Q_n$ are acquired according to the photographed picture of each of the winding layers of the reference battery, and $P_n$ and $Q_n$ are imported into the relation $P_n^T F_i' Q_n = 0$ to calculate the to-be-calculated parameters in FC of each of the winding layers.

4. The battery winding method according to claim 1, wherein at the convening, the conversion matrix $F_i$ is used to establish a formula (2) which converts the position data of the first point into the converted position data of the converted first point, $$P^T F_i Q = 0 \qquad (2),$$

wherein, P represents the position data $(x_P, y_P, 1)$ of the first point in the picture of the current winding layer photographed at the photographing, $x_P$ is a coordinate in the first direction, $y_P$ is a coordinate of the first point in the second direction perpendicular to the first direction in the picture of the current winding layer photographed at the photographing step, and PT is transposition of P;

Q represents the converted position data $(x_Q, y_Q, 1)$ of the first point in the picture of the current winding layer photographed at the photographing, $x_Q$ is a coordinate of the second point in the first direction in the picture of the current winding layer Photographed at the photographing, and $y_Q$ is a to-be-calculated coordinate in the second direction;

the conversion matrix $F_i$ is $$\begin{bmatrix} A11 & A12 & A13 \\ A21 & A22 & A23 \\ A31 & A32 & 1 \end{bmatrix},$$

comprising eight parameters, A11, A12, A13, A21, A22, A23, A31 and A32, representing a relation of converting P into Q in the $i^{th}$ winding layer;

i represents the number of winding layers; and $x_P$, $y_P$, $X_Q$ and $F_i$ are imported into $P^T F_i Q = 0$ to calculate $y_Q$;

in the picture of the current winding layer photographed at the photographing, a coordinate in the second direction, in the position data of the second point is selected and defined as $y_R$; and a difference between $y_Q$ and $y_R$ is calculated to obtain data of displacement between the first electrode plate and the second electrode plate.

5. The battery winding method according to claim 1, wherein in the picture of the current winding layer photographed at the photographing step, the first area shows the first diaphragm which is not wound on the winding shaft yet, while the second area shows the second diaphragm which is already wound on the winding shaft, and the first diaphragm and the second diaphragm respectively exceed the first electrode plate and the second electrode plate in the second direction perpendicular to the first direction;

the first position data further comprises position data of a third point of the first diaphragm in the first area and position data of a fourth point of the second diaphragm in the second area, wherein the third point of the first diaphragm is the middle point of an edge, exceeding the first electrode plate, of the first diaphragm in the picture of the current winding layer, the fourth point of the second diaphragm is the middle point of an edge, exceeding the second electrode plate, of the second diaphragm in the picture of the current winding layer; and according to the data of displacement between the first electrode plate and the second electrode plate, the first point, the second point, the third point and the fourth point are marked on a straight line where the coordinates in the first direction are located to obtain the data of displacement among the first electrode plate, the first diaphragm, the second electrode plate and the second diaphragm.

6. A battery winding system, comprising:
a winding shaft for winding; a layer of membrane composite of a to-be manufactured battery, the membrane composite comprising a first electrode plate, a first diaphragm, a second electrode plate and a second diaphragm which are laminated in turn;
a photographing module arranged at a fixed position, configured to take a picture of a current winding layer each time the membrane layer composite is wound on the winding shaft by a cycle, the picture of the current winding layer comprising a first area and a second area which parallel to each other in a first direction perpendicular to the winding shaft, the first area showing the first electrode plate which is not wound on the winding shaft yet, and the second area showing the second electrode plate which is already wound on the winding shaft; and
a control unit, configured to:
acquire position data of a first point in the first area and position data of a second point is acquired in the second area according to the photographed picture of the current winding layer, the first point being a middle point of an edge of the first electrode plate in parallel with the first direction, and the second point being a middle point of an edge of the second electrode plate in parallel with the first direction;
convert the position data of the first point to obtain converted position data of the converted first point using a preset conversion matrix, corresponding to the current winding layer, based on the number of the current winding layers;
calculate data of displacement between the first electrode plate and the second electrode plate based on the converted position data of the converted first point and the position data of the second point;
determine whether the data of displacement is within a threshold value scope; and
control the winding shaft to wind a next layer of the membrane composite when the data of displacement is within the threshold value scope, or
send an alarm when the data of displacement is not within the threshold value scope.

7. A battery, produced by a battery winding method that comprises:
winding a membrane composite on a winding shaft, the membrane composite comprising a first electrode plate, a first diaphragm, a second electrode plate and a second diaphragm which are laminated in turn;
each time the membrane composite is wound on the winding shaft by one cycle, acquiring a picture of a current winding layer of the membrane composite by a photographing module arranged at a fixed position, the picture of the current winding layer comprising a first area and a second area which are parallel to each other in a first direction perpendicular to the winding shaft, the first area showing the first electrode plate which is not wound on the winding shaft yet, and the second area showing the second electrode plate which is already wound on the winding shaft;
acquiring position data of a first point in the first area and position data of a second point in the second area according to the picture of the current winding laver, the first point being a middle point of an edge of the first electrode plate in parallel with the first direction, and the second point being a middle point of an edge of the second electrode Plate in parallel with the first direction;
converting the position data of the first point to obtain converted position data of a converted first point using a preset conversion matrix corresponding to the current winding layer based on the number of the current winding layers;
calculating data of displacement between the first electrode plate and the second electrode plate based on the converted position data of the convened first point and the position data of the second point;
determining whether the data of displacement is within a threshold value scope; and
winding a next layer of the membrane composite when the data of displacement is within the threshold value scope, or
sending an alarm when the data of displacement is not within the threshold value scope.

* * * * *